United States Patent
Fusillo et al.

(10) Patent No.: US 10,430,727 B1
(45) Date of Patent: Oct. 1, 2019

(54) SYSTEMS AND METHODS FOR PRIVACY-PRESERVING GENERATION OF MODELS FOR ESTIMATING CONSUMER BEHAVIOR

(71) Applicant: NFL Enterprises LLC, New York, NY (US)

(72) Inventors: Iwao Fusillo, Merrick, NY (US); Justin Friedman, Brooklyn, NY (US); Robert Joseph Yang, Seattle, WA (US); David Samuel Highhill, New York, NY (US); Adriane Beth Berman, New York, NY (US); Nitish Basandra, New York, NY (US)

(73) Assignee: NFL Enterprises LLC, New York, NY (US)

( * ) Notice: Subject to any disclaimer, the term of this patent is extended or adjusted under 35 U.S.C. 154(b) by 0 days.

(21) Appl. No.: 16/374,594

(22) Filed: Apr. 3, 2019

(51) Int. Cl.
    *G06Q 30/02* (2012.01)
    *G06N 20/00* (2019.01)

(52) U.S. Cl.
    CPC ......... *G06N 20/00* (2019.01); *G06Q 30/0269* (2013.01)

(58) Field of Classification Search
    CPC .................................. G06Q 30/0251–30/0271
    See application file for complete search history.

(56) References Cited

U.S. PATENT DOCUMENTS

| | | | |
|---|---|---|---|
| 7,690,564 B2 | 4/2010 | Rane et al. | |
| 7,949,565 B1 * | 5/2011 | Eldering | G06Q 30/02 705/14.49 |
| 8,239,250 B2 | 8/2012 | Kalia et al. | |
| 8,401,947 B2 | 3/2013 | Kalia et al. | |
| 8,577,933 B2 | 11/2013 | Evenhaim | |
| 8,615,458 B2 | 12/2013 | Kalia et al. | |
| 8,838,629 B2 | 9/2014 | Dedeoglu et al. | |
| 8,857,708 B2 | 10/2014 | Rane et al. | |
| 8,893,292 B2 * | 11/2014 | Wang | G06F 21/6254 726/26 |
| 9,087,335 B2 | 7/2015 | Rane et al. | |
| 9,607,308 B2 | 3/2017 | Dedeoglu et al. | |
| 9,760,735 B2 | 9/2017 | Dedeoglu et al. | |
| 9,916,594 B2 | 3/2018 | Rane et al. | |
| 2002/0194058 A1 * | 12/2002 | Eldering | G06Q 20/20 705/14.65 |

(Continued)

OTHER PUBLICATIONS

Du, Wenliang et al.; Building Decision Tree Classifier on Private Data; 2002 IEEE International Conference on Data Mining Workshop on Privacy, Security, and Data Mining; 8 pages. (Year: 2002).*

(Continued)

*Primary Examiner* — Stanley K. Hill
(74) *Attorney, Agent, or Firm* — Vinson & Elkins LLP

(57) ABSTRACT

A system, method, and computer readable storage media for training a model to estimate an unknown consumer behavior while preserving consumer privacy by combining a first training data set of a first organization with a second training data set of a second organization on a third-party computer system, wherein the second training data set contains an attribute value the first organization wishes to estimate, and wherein the first organization cannot access the third-party computing system, providing a trainable model definition to the third-party computer, training the model, and returning the trained computer model.

24 Claims, 15 Drawing Sheets

(56) References Cited

U.S. PATENT DOCUMENTS

| | | | |
|---|---|---|---|
| 2009/0012839 | A1 | 1/2009 | Fusillo et al. |
| 2014/0081705 | A1 | 3/2014 | Kalia et al. |
| 2015/0019338 | A1* | 1/2015 | Sotomayor ........ G06Q 30/0261 |
| | | | 705/14.55 |
| 2015/0339493 | A1* | 11/2015 | Ioannidis ............ G06F 21/6245 |
| | | | 726/28 |
| 2016/0041998 | A1* | 2/2016 | Hall ...................... G06F 16/738 |
| | | | 707/725 |
| 2018/0114027 | A1* | 4/2018 | Bellala .................. G06F 21/602 |
| 2018/0219842 | A1* | 8/2018 | Bellala .................. H04L 63/061 |
| 2019/0087589 | A1* | 3/2019 | Eliazar .................. G06F 21/602 |
| 2019/0188402 | A1* | 6/2019 | Wang ...................... G06N 3/08 |

OTHER PUBLICATIONS

Keshavamurthy, Bettahally N. et al.; Privacy preserving association rule mining over distributed databases using genetic algorithm; Neural Comput & Applic (2013) 22 (Supp 1):S351-S364. (Year: 2013).*

Vaidya, Jaideep et al.; Privacy-Preserving Decision Trees over Vertically Partitioned Data; 2008 ACM Transactions on Knowledge Discovery from Data, vol. 2, No. 3, Article 14; 14:1-14:27. (Year: 2008).*

Vaidya Jaideep et al.; A Survey of Privacy-Preserving Methods Across Vertically Partitioned Data; pp. 337-358. (Year: 2008).*

Vaidya, Jaideep et al.; A Random Decision Tree Framework for Privacy-Preserving Data Mining; 2014 IEEE Transactions on Dependable and Secure Computing, vol. 15, No. 5; pp. 399-411. (Year: 2014).*

Verykios, Vassilios S. et al.; State-of-the-art in Privacy Preserving Data Mining; SIGMOD Record, vol. 33, No. 1 2004; pp. 50-57. (Year: 2004).*

Janbandhu, Sachin et al.; Survey on Data Mining with Privacy Preservation; 2014 International Journal of Computer Science and Information Technologies, vol. 5 (4), 5279-5283. (Year: 2014).*

\* cited by examiner

500

| Identifying information | | | Behavioral Data | | | | | |
|---|---|---|---|---|---|---|---|---|
| 511 | 512 | 513 | 521 | 522 | 523 | 524 | 525 | 526 |
| Name | Address | City | Shop Speed | Season Ticket Speed | IPTV Subscription | SITV Subscription Level | Video Game Minutes Played | Fantasy Page Views |
| Jessica Smith | 901 Michael Bridge Suite 098 | South Christopher | 321.45 | 3035.59 | FALSE | NONE | 1713.7 | 2172 |
| Timothy Chavez | 83052 Sandoval Drive Apt. 721 | Danielside | 398.51 | 0 | FALSE | NONE | 3887.7 | 0 |
| Pamela Simpson | 0792 Kimberly Stravenue Apt. 126 | North Alyssa | 712.44 | 0 | FALSE | NONE | 5.0 | 939 |
| Jillian Jones | 40383 Meridian Wells | South Brenda | 715.38 | 0 | TRUE | STANDARD | 0.0 | 3236 |
| Kevin Turner | 7875 Brandon Drive Apt. 318 | New Brandon | 312.87 | 0 | TRUE | STANDARD | 0.0 | 0 |
| Francis Lane | 4486 Hill Courts | East Jennifer | 330.46 | 475.1 | FALSE | NONE | 2538.6 | 1327 |
| Kyle Harris | 770 Swanson Prairie Apt. 571 | Beasleyside | 567.41 | 3068.93 | TRUE | STANDARD | 5166.8 | 2374 |
| Judith Miller | 1345 Anthony Bypass Suite 325 | Ryanport | 1065.51 | 1934.17 | TRUE | PREMIUM | 0.0 | 1126 |
| Dr. Travis Taylor MD | 32886 Nguyen Road Suite 999 | Williamston | 307.84 | 2915.92 | FALSE | NONE | 0.0 | 1364 |
| Bobby Carter | 30595 Charles Brook Suite 998 | Warrenland | 526.17 | 1807.64 | FALSE | NONE | 6831.7 | 986 |

| Identifying Information | | | External Unknown Behavior |
|---|---|---|---|
| 611 | 612 | 613 | 621 |
| Name | Address | City | Minutes Viewed |
| Francis Lane | 4486 Hill Courts | East Jennifer | 2899.1 |
| Kyle Harris | 770 Swanson Prairie Apt. 571 | Beasleyside | 5188.9 |
| Judith Miller | 1345 Anthony Bypass Suite 325 | Ryanport | 3898.3 |
| Dr. Travis Taylor MD | 32886 Nguyen Road Suite 999 | Williamston | 3855.6 |
| Bobby Carter | 30595 Charles Brook Suite 998 | Warrenland | 2393.5 |
| Kenneth Wood | 42728 Stephens Knolls | East Mindyville | 1397.1 |
| Beth Mueller | 2831 Sue Road | South Jacob | 218.0 |
| Devon Pennington | 39100 Green Haven | New Ryan | 1888.3 |
| Jesse Wallace | 4664 Snyder Forge Apt. 282 | New Amyshire | 3873.8 |
| Melissa Collier | 871 Kayla Squares | Douglasbury | 1712.1 |

| | Identifying Information | Demographic Data | | | | Behavioral Data | | | | | Predicted Behavioral Attribute | Total Revenue | Cluster Membership |
|---|---|---|---|---|---|---|---|---|---|---|---|---|---|
| | 1511 | 1521 | 1522 | 1523 | 1524 | 1525 | 1531 | 1532 | 1533 | 1534 | 1535 | 1541 | 1551 | 1561 |
| | Name | Gender | Age | Region | Favorite Team | In-Market | Shop Purchase | Season Ticket Spend | DTV Subscription | Video Game Minutes Played | Fantasy Page Views | Minutes Viewed | Total Revenue | Cluster Membership |
| | Jessica Smith | F | 40 | Southeast | Denver Broncos | FALSE | $21.99 | 2035.99 | NONE | 1711.726 | 2172 | 800 | $ 577.98 | 1 |
| | Timothy Chavez | M | 51 | Mid-Atlantic | Tennessee Titans | FALSE | 385.51 | 0 | NONE | 1887.704 | 0 | 1208 | $ 492.27 | 5 |
| | Pamela Ferguson | F | 41 | Southeast | Dallas Cowboys | TRUE | 712.44 | 0 | NONE | 0 | 633 | 2208 | $ 866.44 | 7 |
| | Alan Jones | M | 48 | Pacific Northwest | Philadelphia Eagles | FALSE | 773.16 | 0 | STANDARD | 0 | 878 | 2235 | $1,909.98 | 6 |
| | Kevin Torres | M | 55 | West Coast | Tampa Bay Buccaneers | FALSE | 312.87 | 0 | STANDARD | 4538.04 | 0 | 1875 | $ 663.87 | 1 |
| | Frances Lane | F | 25 | Southeast | Los Angeles Chargers | TRUE | 193.48 | 475.13 | NONE | 5,146.821 | 1527 | 750 | $ 398.80 | 3 |
| | Kate Harris | F | 37 | New England | Tennessee Titans | TRUE | 567.41 | 3966.59 | STANDARD | 0 | 2374 | 950 | $ 841.57 | 8 |
| | Judith Miller | F | 47 | Midwest | New York Jets | TRUE | 1065.51 | 1884.17 | STANDARD | 0 | 1120 | 600 | $1,907.51 | 6 |
| | Dr. Travis Taylor MD | M | 48 | Midwest | Chicago Bears | FALSE | 107.84 | 2915.82 | NONE | 0 | 1364 | 380 | $ 138.84 | 2 |
| | Bobby Carter | M | 45 | West Coast | Jacksonville Jaguars | FALSE | 748.17 | 1867.64 | NONE | 6921.707 | 936 | 225 | $ 763.83 | 2 |

1500

1510 — 1520 — 1530 — 1540 — 1550 — 1560

SYSTEMS AND METHODS FOR PRIVACY-PRESERVING GENERATION OF MODELS FOR ESTIMATING CONSUMER BEHAVIOR

TECHNICAL FIELD

The present disclosed technology relates to systems, methods, and computer readable storage media containing instructions for producing estimator models of unknown consumer behaviors. The present disclosed technology further relates to methods and systems for attributing revenue to individual consumers, and automatically segmenting consumers into related groups.

BACKGROUND

Organizations who market products and services indirectly ("indirect businesses") frequently struggle to collect complete usage data at the consumer level. That is, while the indirect business may know in the aggregate that they have a particular number of consumers and the total consumption of their products or services, they are unable to determine what amount of each product or service is consumed by a particular consumer. Even as organizations possess ever increasing volumes of information about their consumers, indirect businesses like film production companies, sports leagues, and similar organizations do not have complete information about how each consumer is using their products and services. This is, in part, because there are numerous intermediating companies between indirect businesses and their ultimate consumer, such as TV networks, internet streaming services, merchandise shops, and others. Frequently, these intermediating companies can and do collect direct usage metrics for individual users, but they are either unable or unwilling to share that data. While the problem is particularly acute for media companies, the problem of indirect sales is present across many other industries, such as movie studios who sell through movie theaters, etc. Often the only reliable source of usage metrics comes from survey companies that collect data from a reasonably sized and/or representative sample of consumers that agree to have certain behaviors monitored or recorded. Even if these survey companies are willing to share aggregate statistics, and extrapolated estimates of total behavior, many such companies are still unwilling or unable to share per-consumer survey data, even for their panel members.

Even without per-consumer consumption data, many indirect businesses nevertheless have considerable databases with other consumer information. This information can come from manually submitted preference or profile data, such as a consumer's name, address, birthdate, favorite team or show, etc. In addition, indirect businesses often log information regarding interactions consumers have with the organization's products and services that are under the organization's control, such as webpage views, merchandise purchased, digital subscriptions, etc. These organizations may also be able to obtain consumer data from affiliates and business partners whose incentives are aligned with the indirect business's or who have contractual arrangements that permit sharing of certain consumer data.

Nevertheless, extremely valuable information—per-user consumption of their primary products or services—often remains out of reach. Because these indirect businesses cannot identify each individual consumer's consumption levels, they are often unable to identify consumers that are high-volume purchasers and users, understand how each consumer's interests affects his or her consumption, and are missing important information to shape future decisions about marketing and new products and services for its consumers. This long felt need to estimate per-product or per-service consumption, while preserving consumer privacy, is solved by the present disclosed technology, among other benefits.

The technology disclosed herein meets this need by using data within an indirect business's possession, combined with per-consumer data in the possession of a survey company to train a machine learning model to estimate, based on information in the indirect business's possession, per-consumer consumption values. The present disclosed technology further provides for combining the indirect business's data and the survey company's data on a system isolated from the indirect business. The indirect business can define machine learning or statistical models to be trained on the combined data, validate the trained model, and use it to estimate consumption by consumers in its own records without accessing the combined information. In this way, the per-consumer consumption information in possession of a survey company is not exposed to the direct business, the survey panel member's privacy is preserved, and the indirect business is able to obtain accurate estimates of each consumer's consumption of their products and services.

The present disclosed technology further includes a system and method for using consumer data to produce actionable consumer segmentation, including in conjunction with the modeling process described above. The present disclosed technology further provides methods to attribute revenue and/or profit derived from numerous sources to each consumer on a per-consumer level.

While certain embodiments of the present disclosure are described with respect to indirect businesses determining media consumption, and the use of survey panel data, it is understood that the full scope of the disclosed technology encompasses the use of similar techniques for indirect businesses determining consumption of other products or services. Indeed, embodiments of the present disclosure are suitable for producing models to estimate product and/or service consumption, or any other consumer behavior, based on combining internal available data with actual measured values of that consumer behavior in the possession of another organization.

SUMMARY

Aspects of the technology disclosed herein include a computer-implemented method for training a model to estimate an unknown consumer behavior while preserving consumer privacy, comprising the steps of: calculating, by a modeling computing system, a vector representing a consumer's behavior by applying one or more vectorization rules to a set of behavioral attribute values for the consumer in a data set of a first organization, transforming the vector, by the modeling computing system, into an estimated unknown consumer behavioral attribute by applying a trained model, wherein the model was trained by: providing, to a second computing system separate from the modeling computing system, a first training data set of the first organization for a plurality of consumers, wherein the training data set comprises, for each consumer, common identifying information, and a set of behavioral attribute values, and a second training data set of a second organization for a plurality of consumers, wherein the second training data set comprises, for each consumer, common identifying information, and actual behavioral attribute values for the unknown behavioral data attribute, combining, by the second computing system, the first training data set and the second training data set into a joined data set by joining the one or more behavioral data attribute values of the first data set and the actual behavior attribute values for the unknown behavioral attribute of the second data set, for each consumer, where the common identifying information of the first data set and the common identifying information of the second set correspond, calculating, by the second computing system, a vectorized training data set by applying the one or more vectorization rules to vectorize the set of behavioral attribute values for each consumer in the joined data set into a set of training vectors, accepting, by the second computing system, a trainable model definition from an external source, wherein a trainable model defined by the trainable model definition accepts a training vector as input, and produces an estimated unknown behavioral data attribute as an output, creating in one or more memories of the second computing system the defined trainable model, training, by the second computing system, the defined trainable model on the training vectors corresponding to a first subset of consumers in the joined data set to produce the trained model.

In some embodiments, training the model further comprises validating, by the second computing system, the trained model by transforming each training vector in a second subset of consumers in the joined data set into an estimated unknown behavioral data attribute, comparing the estimated unknown behavioral data attribute to the actual behavioral attribute value to produce a performance metric, and determining whether the performance metric falls within a predetermined range of acceptable performance values, wherein the first subset of consumers and the second subset of consumers is mutually exclusive. In some embodiments, the trained model is a decision tree, and wherein the step of training the defined trainable model further comprises pruning each terminal node of the decisions tree wherein the terminal node includes fewer than a predetermined number of consumers, or a predetermined percentage of the total number of consumers. In some embodiments, the set of behavioral attributes of the first training data set is a subset of available behavioral attributes, wherein the set of behavioral attributes are selected such that each behavioral attribute in the set of behavioral attributes is substantially statistically independent. In some embodiments, each behavioral attribute in the first training data set was selected by: evaluating the statistical independence of each pair of available behavioral attribute values for consumers in a consumer data set comprising available behavioral attribute values for a plurality of consumers, aggregating the available behavioral attributes into substantially statistically independent subsets of behavioral attributes, and selecting one behavioral attribute from each substantially statistically independent subset of behavioral attributes. In some embodiments, the first organization cannot access the second training data set of a second organization, and the joined data set. In some embodiments, training the model further comprises the step of validating the trained model by calculating the sum of the estimated unknown consumer behavior for all consumers in a consumer data set, and comparing the sum to an estimated total behavior. In some embodiments, training the model further comprises the step of destroying the joined data set.

Embodiments of the disclosed technology can further include computing systems configured to implement the methods disclosed herein, and non-transitory computer-readable storage media containing instructions that, when executed, perform such methods. Further, embodiments of the present disclosed technology can comprise combinations of the features described above, as well as the various features described in the description, figures, and claims.

BRIEF DESCRIPTION OF THE FIGURES

Included in the present specification are figures that illustrate various embodiments of the present disclosed technology. As will be recognized by a person of ordinary skill in the art, actual embodiments of the disclosed technology need not incorporate each and every component illustrated, but may omit components, add additional components, or change the general order and placement of components. Reference will now be made to the accompanying figures and flow diagrams, which are not necessarily drawn to scale, and wherein:

FIG. 5 depicts an example of a first training data set of a first organization for a plurality of consumers that includes common identifying information and various behavioral attributes for each consumer in accordance with an embodiment.

FIG. 6 depicts an example of a second training data set of a second organization that includes common identifying information and an unknown behavioral attribute for each consumer in accordance with an embodiment.

FIG. 7 depicts an example of a joined data set that was created from the blind join between the first training data set and the second training data set on the second computer system in accordance with an embodiment.

FIG. 8 depicts a data of vectorization of the behavioral attributes to support machine learning in accordance with an embodiment.

FIG. 10 depicts an example of validation data for a trained estimator model in accordance with an embodiment.

FIG. 15 depicts an example table of an annotated 360-View in accordance with an embodiment.

DETAILED DESCRIPTION

Figure 1:
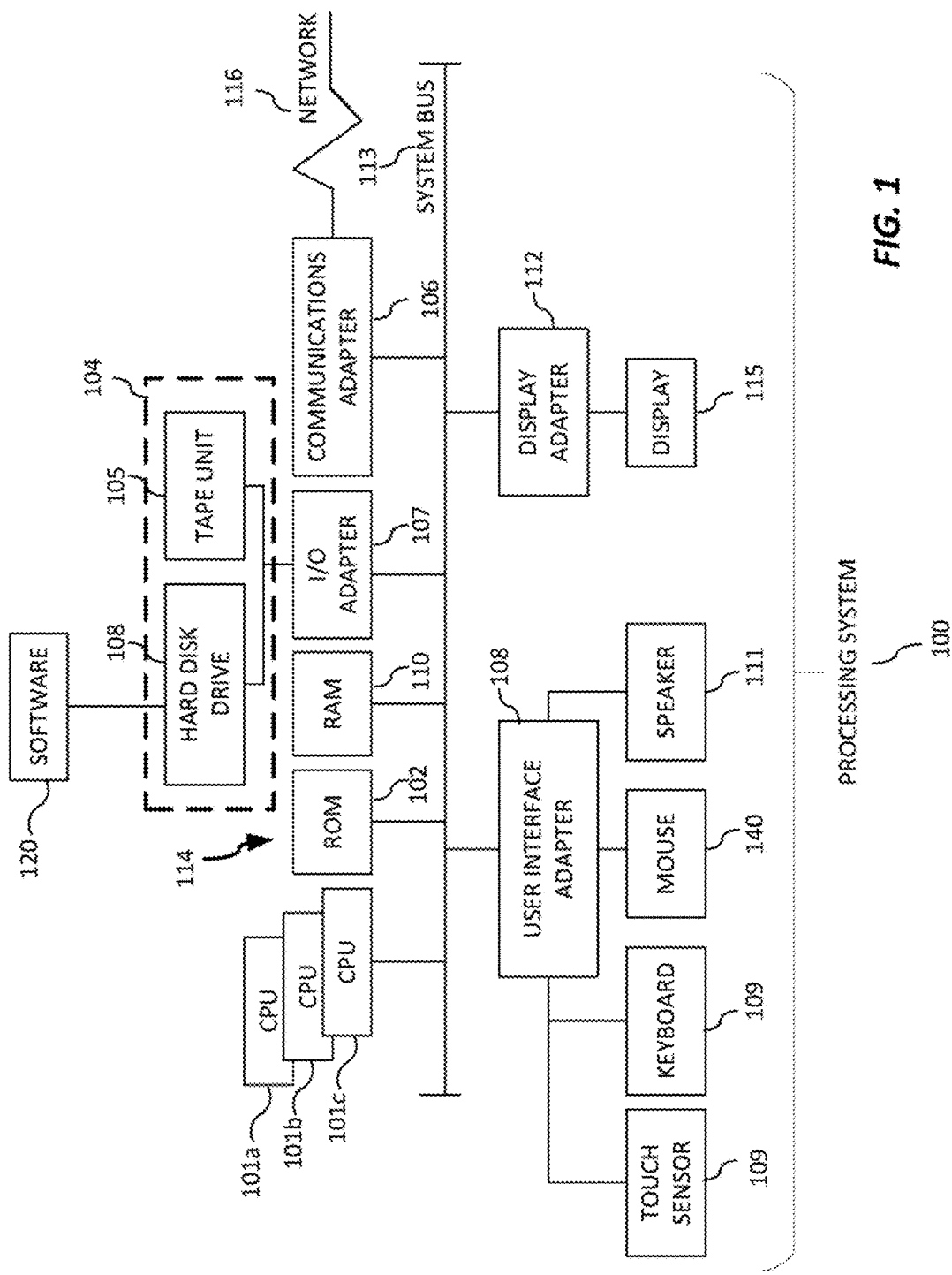
FIG. 1 depicts a computing device in accordance with an embodiment.

The following detailed description is directed to systems, methods, and computer-readable media for privacy-preserving generation of predictive models for estimating consumer behavior.

Although example embodiments of the present disclosure are explained in detail, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

The term "comprising" or "containing" or "including" is meant that at least the named element, material, or method step is present in the composition or article or method, but does not exclude the presence of other elements, materials, or method steps, even if the other such elements, material, or method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

In the following detailed description, references are made to the accompanying drawings that form a part hereof and that show, by way of illustration, specific embodiments or examples. In referring to the drawings, like numerals represent like elements throughout the several figures.

Various products and services provided by third parties are mentioned as example components of embodiments in accordance with the disclosed technologies. The use of trademarked (registered or common-law) names are intended for descriptive purposes only—no claim of ownership over those terms is asserted by the applicants by this application. Further, the mention of a trademarked product or service is as an example only. Other products and services providing equivalent functions, whether commercial, open-source, or custom-developed to support embodiments are contemplated in accordance with the disclosed technology.

Certain examples of the disclosed technology are discussed and shown herein using names, addresses, behavioral attributes, financial data, and other forms of personal data. All such data is fictitious. No actual personal data is provided herein. Any correspondence between data provided in this application and actual persons, living or dead, is purely coincidental. In addition, the examples of business metrics are merely examples. Embodiments of the present disclosed technology are not limited to merely these metrics.

The term "attribute" as used herein refers to a category of data kept for each record in a plurality of records. In most instances, each record is a consumer, unless the context indicates otherwise. Non-limiting examples of attributes can comprise a name, address, value of merchandise purchased, season ticket spend, etc.

The term "value" as used herein refers to a specific value for a specific attribute. For example, an "attribute" can be names, and an attribute value can be a particular consumer's name.

The term "trainable model" as used herein refers to a computer model that (1) estimates an output value or values as (2) a function of one or more input values, and (3) is configured by processing one or more training examples, each training example comprising a target output value or values and one or more input values corresponding to the target output value or values.

The terms "known behavioral attribute" and "unknown behavioral attribute" as used herein refer to whether the behavioral attribute is known to a first organization. That is, whether something is "known" is determined relative to the first organization. An "unknown behavioral attribute" as used herein refers to a behavioral attribute that is known to another organization, but unknown to the first organization.

The term "partner behavioral attribute" as used herein refers to a behavioral attribute that is known to a third-party and unknown to a first organization, but accessible by the first organization.

Referring now to FIG. 1, there is shown an embodiment of a processing system 100 for implementing the teachings herein. In this embodiment, the processing system 100 has one or more central processing units (processors) 101a, 101b, 101c, etc. (collectively or generically referred to as processor(s) 101). Processors 101, also referred to as processing circuits, are coupled to system memory 114 and various other components via a system bus 113. Read only memory (ROM) 102 is coupled to system bus 113 and may include a basic input/output system (BIOS), which controls certain basic functions of the processing system 100. The system memory 114 can include ROM 102 and random access memory (RAM) 110, which is read-write memory coupled to system bus 113 for use by processors 101.

FIG. 1 further depicts an input/output (I/O) adapter 107 and a network adapter 106 coupled to the system bus 113. I/O adapter 107 may be a small computer system interface (SCSI) adapter that communicates with a hard disk (magnetic, solid state, or other kind of hard disk) 103 and/or tape storage drive 105 or any other similar component. I/O adapter 107, hard disk 103, and tape storage drive 105 are collectively referred to herein as mass storage 104. Software 120 for execution on processing system 100 may be stored in mass storage 104. The mass storage 104 is an example of a tangible storage medium readable by the processors 101, where the software 120 is stored as instructions for execution by the processors 101 to implement a circuit and/or to perform a method, such as those shown in FIGS. 1-7 and 10-11. Network adapter 106 interconnects system bus 113 with an outside network 116 enabling processing system 100 to communicate with other such systems. A screen (e.g., a display monitor) 115 is connected to system bus 113 by display adapter 112, which may include a graphics controller to improve the performance of graphics intensive applications and a video controller. In one embodiment, adapters 107, 106, and 112 may be connected to one or more I/O buses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 140, and speaker 111 can be interconnected to system bus 113 via user interface adapter 108, which may include, for example, a chip integrating multiple device adapters into a single integrated circuit.

Thus, as configured in FIG. 1, processing system 100 includes processing capability in the form of processors 101, and, storage capability including system memory 114 and mass storage 104, input means such as a keyboard 109, mouse 140, or touch sensor 109 (including touch sensors 109 incorporated into displays 115), and output capability including speaker 111 and display 115.

In one embodiment, a portion of system memory 114 and mass storage 104 collectively store an operating system to coordinate the functions of the various components shown in FIG. 1.

Figure 2:
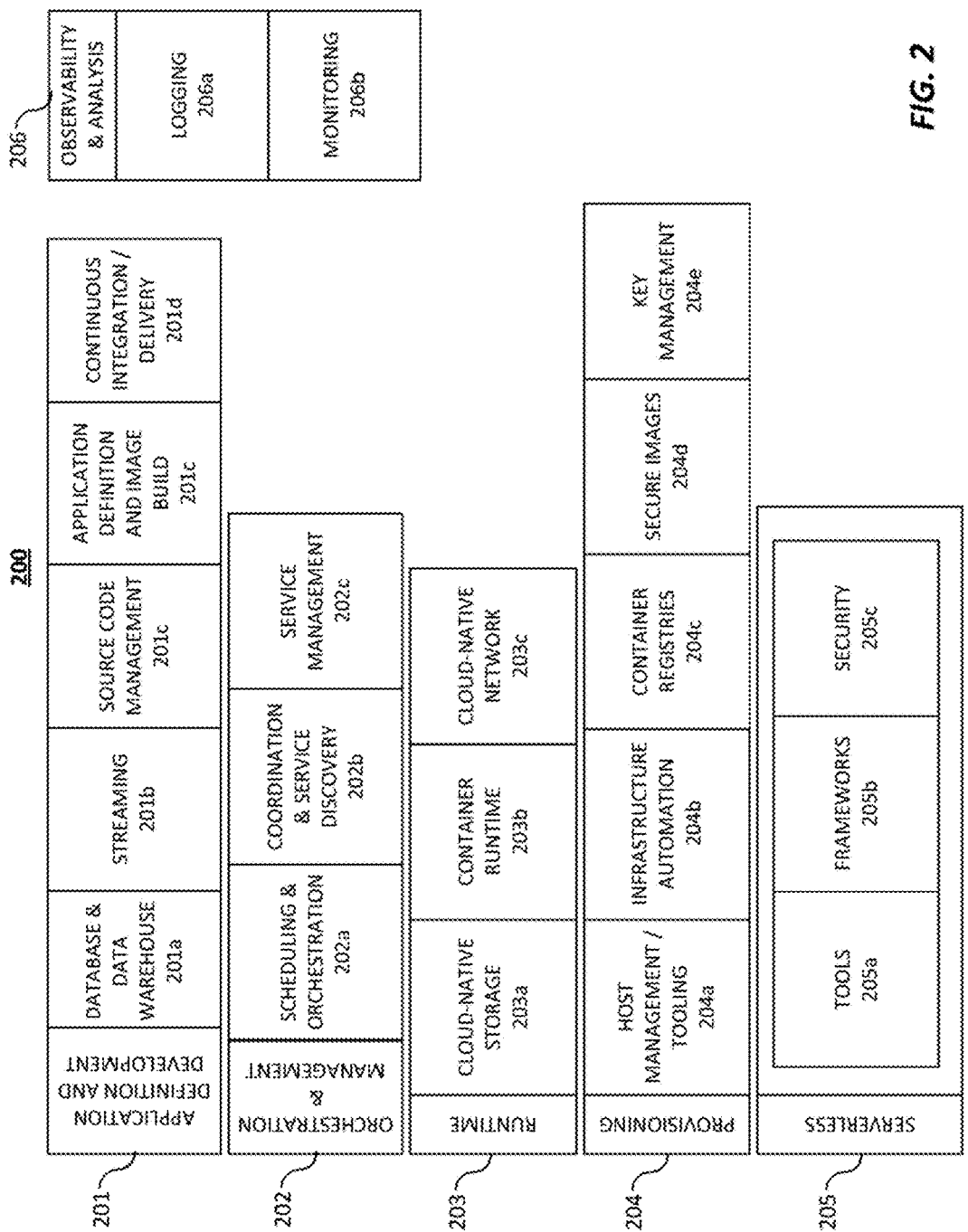
FIG. 2 depicts a cloud computing environment in accordance with an embodiment.

Embodiments of the present technology can also be implemented using cloud-based technologies, such as those depicted in FIG. 2. Cloud native technologies include scalable applications in modern, dynamic environments such as public, private, and hybrid clouds. Containers, service meshes, microservices, immutable infrastructure, and declarative APIs exemplify this approach.

Embodiments of the disclosed technology can be built using one or more elements of cloud computing technology as shown in FIG. 2. Cloud technologies can include application definition and development tools 201, orchestration & management tools 202, runtime tools 203, provisioning tools 204, serverless components 206, and observability & analysis tools.

Application definition and development components 201 ("ADD") enable developers to define and develop applications prior to deployment, and to refine those designs in subsequent versions. ADD components 201 can include database and data warehouse components 201a that provide data sets and data storage for application development. These database and data warehouse components 201a include relational and non-relational data stores, graph databases, flat files, and other data storage technologies. ADD components 201 can further include streaming components 201b that facilitate rapid distribution of data to numerous system endpoints, such as message queues, stream processing software, and other data distribution systems. ADD components 201 can further include source code management components 201c, such as Git, Mercurial, Subversion, and other similar source management systems. Source code management components 201c can also include cloud-based servers for version control, such as GitHub or GitLab. ADD components 201 can further include application definition and image build components 201d that allow developers to define cloud-based infrastructure, including configurations of application servers, software defined networks, and containerized services. ADD components 201 can further include continuous integration and continuous delivery (CI/CD) components 201e that automate the process of application testing and deployment. CI/CD components 201e can be configured to automatically run automated tests on application software (e.g. such as when a change is committed to a version control platform), and if the tests are successful, to deploy the application software to a production environment.

Orchestration & management ("OM") components 202 facilitate the containerization and subsequent coordinated execution of application software. OM components 202 include scheduling and orchestration components 202a that schedule and run containerized software. Non-limiting examples of scheduling and orchestration components 202a include Kubernetes and Docker Swarm. OM components 202 can further include coordination and service discovery components 202b that allow software to automatically discover cloud-based resources, such as data stores, data streaming sources, etc. OM components can further include service management components 202c that can include load balancers, reverse proxy systems, auto scalers, and other components that facilitate autonomous or manual application scaling.

Runtime components 203 can include basic environments for the support execution of cloud-based application software. Runtime components 203 can include cloud-native storage 203a, such as object stores, virtual file systems, block storage, and other forms of cloud-centric data storage. Runtime components 203 can include container runtimes 203b that provide the foundation for containerized application software, such as Docker or Rkt. Runtime components 203 can further include cloud-native network components 203c that provide software-defined networking and virtual private cloud technologies that enable components of cloud-based systems to communicate with each other, as well as with the wider Internet.

Provisioning components 204 can include components intended for configuring cloud components and triggering the creation of cloud resources on various cloud platforms. Provisioning components can include Host Management and Tooling components 204a that define and deploy configurations of cloud components when executed. Provisioning components 204 can further include infrastructure automation components 204b that automate basic cloud infrastructure tasks. Provisioning components 204 can further include container registries 204c that provide storage for containerized cloud applications that are deployable by other provisioning components. Provisioning components can further include secure image components 204d that provide security and verification for container images to ensure consistent and reliable deployment of trusted container images. Provisioning components can further include key management systems 204e that provide for secure storage of cryptographic keys.

Serverless components 205 can include components for deploying cloud applications that do not rely upon a continuously running (or scheduled) runtime execution, but instead run discrete components of functionality given a condition. Serverless components 205 can include components 205a to simplify the development of serverless applications, such as components that convert server-centric software into serverless code, event simulators, and simulations of cloud-based serverless platforms. Serverless components 205 can also include frameworks 205b that are predefined systems that take code in certain configurations and deploy them as serverless applications in cloud environments. Serverless components 205 can also include security components 205c that help to secure serverless applications.

Observability & analysis components ("O&A") 206 can include systems for monitoring running cloud applications, detecting and observing defects and errors, and logging system performance. O&A components 206 can include monitoring components 206a that monitor running systems to display and/or record performance metrics, error rates, and other application data. O&A components 206 can also include logging components 206b that collect system logs from cloud-based components and aggregate them in a single place or to a single access point to review system performance. O&A components 206 can also include tracing components 206c that collect detailed trace logs when cloud components run into errors, system exceptions, and other problematic behaviors to assist in the identification and remediation of problems in cloud-based systems.

In some embodiments, one or more methods are embodied in a set of instructions for one or more processors having access to one or more types of memory. The instructions could be coded in hardware or in software. Many kinds of platforms may be used, including but not limited to: computers, mobile telephones, tablet devices, game consoles, network management devices, field-programmable gate arrays, and cloud-based computer systems. Aspects of the disclosure could be deployed on multiple devices for concurrent operation. Embodiments may be used as a component of a larger system.

As will be appreciated by one skilled in the art, aspects of the present disclosed technology may be embodied as a system, method or computer program product. Accordingly, aspects of the present disclosed technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosed technology may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In some embodiments, the computer readable medium can be a non-transitory storage system on a cloud platform, such as, for example, in a database or data warehouse component 201*a*, a source code management tool 201*c*, cloud-native storage component 203*a*, embodied in a container image stored locally or in a container registry 204*c*, or deployed in a container runtime 203*b*. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosed technology may be written in any combination of one or more programming languages, including languages such as Java, Scala, Python, Julia, R, SAS, Go, Ruby, Javascript, Smalltalk, C++ or the like. As defined herein, computer program code also includes the build artifact of the above languages, or similar languages and environments, such as object code, byte- or word-code, or other compiled, interpreted, transpiled, or otherwise processed code. The program code may execute entirely on the user's computer, partly on the user's computer, as a stand-alone software package, partly on the user's computer and partly on a remote computer or entirely on one or more remote computers, servers, or serverless cloud platforms. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present disclosed technology are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The disclosed technology is disclosed in terms of modules and submodules, each of which are to be understood as discrete units of functionality, which can be embodied as classes, modules, functions, compilation or build artifacts, or other components of one or more programming languages used to implement embodiments of the disclosed technology. While the present description illustrates one organization of the various modules and submodules for implementing embodiments of the disclosed technology, the disclosed technology is not so limited. Embodiments of the present disclosed technology can include other organizations for implementing equivalent or overlapping functionality for the various modules described herein, such as by sharing functionality between modules, combining modules, separating modules into multiple modules, implementing class hierarchies and the like. Additionally, the accompanying drawings illustrate examples of relationships between various modules and submodules (such as by flowchart connectors or inclusion of modules as sub-modules of other modules), but these relationships are not limiting. As would be recognized by a person of ordinary skill in the art, the output of any given module is available to be included as part of the input of any other component in accordance with various embodiments.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart and/or block diagram block or blocks.

Technical effects and benefits include producing trained models for estimating an unknown consumer behavior based on one or more known consumer behaviors, and in applying the trained model to estimate unknown consumer behaviors.

Figure 3:
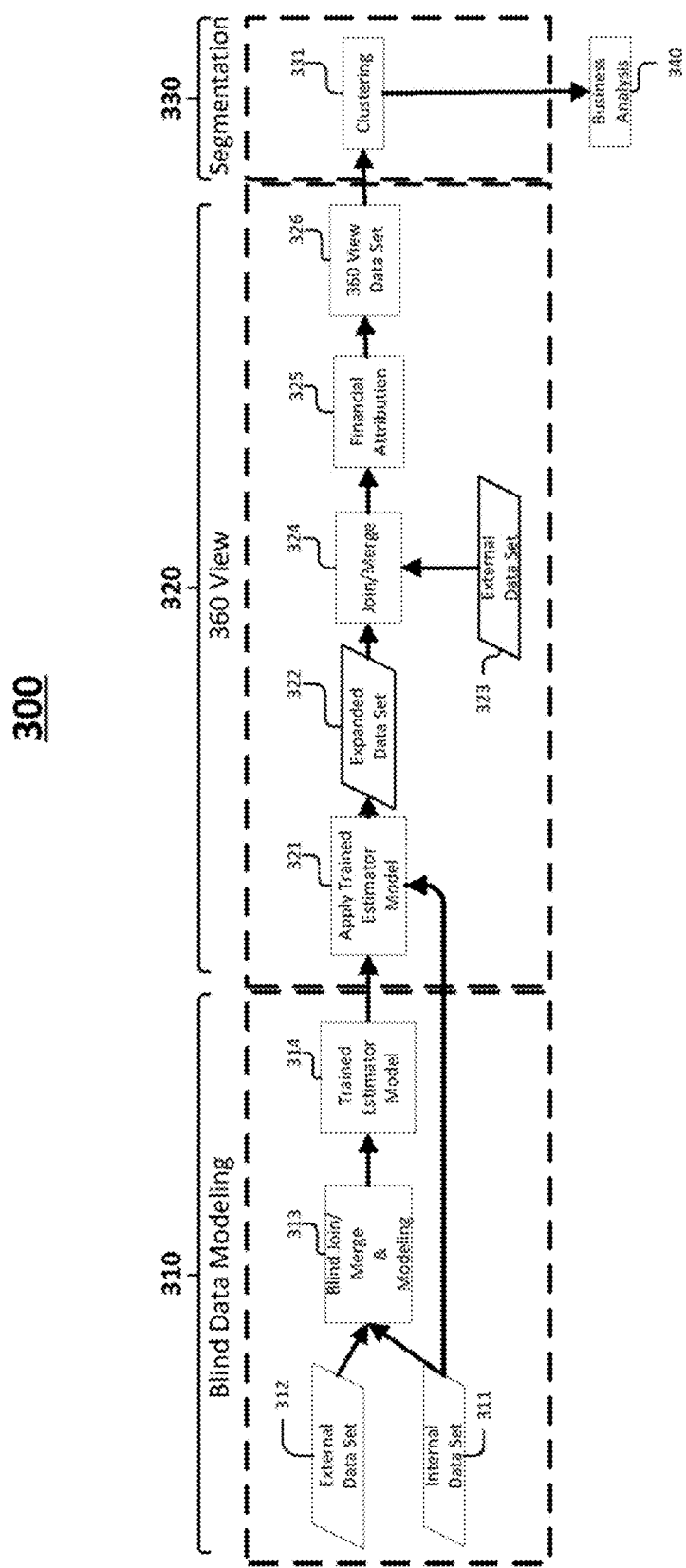
FIG. 3 depicts an overall architecture of a system in accordance with an embodiment.

FIG. 3 depicts a system architecture 300 for implementing an embodiment of the disclosed technology. The system architecture 300 can comprise blind data modeling 310 of one or more data sets, constructing a 360-View 320 of one or more data sets, and segmentation 330 of one or more data sets.

Blind data modeling 310 can comprise a first organization that provides an internal data set 311 to a third-party. The internal data set 311 comprises one or more behavioral attributes and common identifying information ("CII") for a plurality of the first organization's consumers. CII can comprise information that allows behavioral attributes from the internal data set and external data set for a single consumer to be identified. Non-limiting examples of CII can include alphanumeric identifiers, personally identifiable information (e.g. name/address), or values derived therefrom, such as hash values. A second organization can provide an external data set 312 to the same third-party that comprises CII for a plurality of consumers, and an actual value for an unknown behavioral attribute, where the internal data set and external data set have at least some consumers in common. The third-party can join or merge the two data sets and model the relationships between the internal and external data sets 313 to produce a trained estimator model 314.

In some embodiments, the first organization can use this trained estimator model 314 to produce a "360-View" 320 of consumers that includes all known and estimated behavioral attributes, demographic, and CII data for each consumer. The first organization can apply the trained predictive model 321 to the internal data set 311 to estimate the unknown behavioral attributes for each consumer and create an expanded data set 322 that contains estimated consumption data for each consumer. In some embodiments, the first organization can further join or merge 324 the expanded data set 322 with one or more external data sets 323 (e.g., partner data).

The one or more external data sets 323 can include behavioral attributes, CII, and other demographic information for each consumer. The first organization can perform financial attribution 325 to calculate the amount of revenue generated by each consumer based upon available data. The first organization can then construct a 360-View data set 326 that can comprise each consumer's CII, demographic information, behavioral attributes, estimated unknown behavioral attributes, and financial attribution values.

In some embodiments, the first organization can also perform automatic segmentation 330 on the 360-View data set 326. The first organization can also perform clustering 331 on consumer data sets 360-View. The clustering 331 will produce distinct groups of consumers that the first organization can join or merge with the 360-View data set 326. The first organization can use the joined 360-View data set to conduct a business analysis 340.

Benefits of the present disclosed technology can include that the first organization and the second organization can preserve the privacy and CII of their consumers by providing the internal data set 311 and the external data set 312 to a third-party processor. The first organization cannot access the second organization's external data set 312 and the second organization cannot access the first organization's internal data set 311. In addition, neither the first organization nor the second organization can access the joined data set that is constructed during the blind join/merge and model 313 step. In some embodiments, the third-party processor can destroy the joined data set to preserve the privacy and CII of consumers. Nevertheless, the first organization is able to define, train, validate, and/or use machine learning and statistical models to produce estimates of per-consumer consumption for each consumer in the first organization's database.

The disclosed technology can provide useful and accurate data while preserving consumer trust by preserving their privacy. Additionally, blind data modeling 310 can minimize or prevent potential violations of privacy laws, policies, and obligations.

Figure 4:
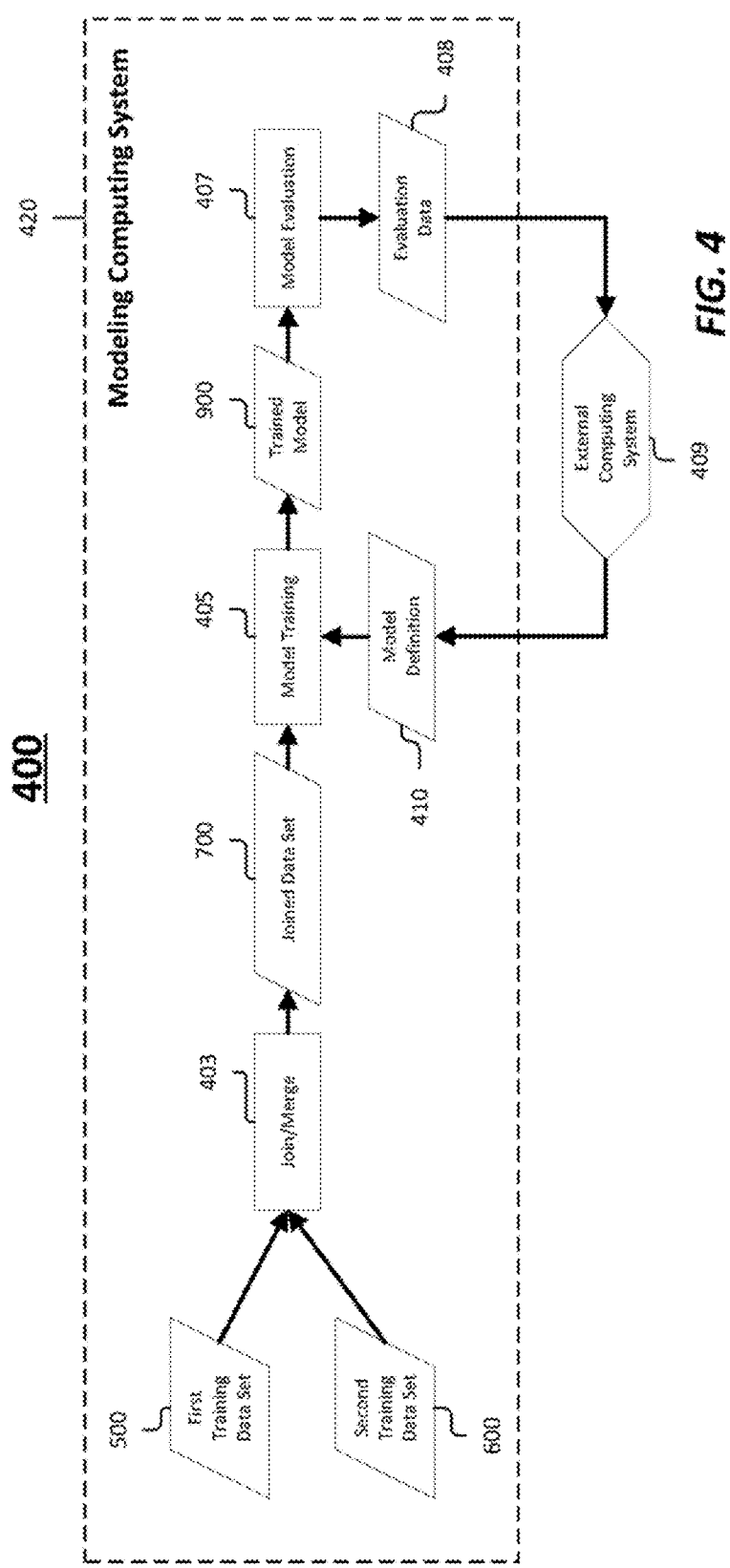
FIG. 4 depicts a block diagram of a blind data modeling architecture in accordance with an embodiment.

FIG. 4. depicts a blind data modeling process 400 in accordance with an embodiment. This process includes a modeling computing system 420 that performs the blind merge 403, model training 405, and model evaluation 407, and an external computing system 409 that provides a trainable model definition 410, and receives model evaluation data 408 from the modeling computing system 420. In some embodiments, the blind data modeling process 400 outputs a trained model 900 to estimate an unknown behavioral attribute of a consumer in a data set while preserving the privacy of each consumer. In some embodiments, the first computing system 420 is controlled by a third-party, and the first organization cannot access joined data set 700 or a training data set from another organization. In some embodiments, the third-party can destroy a joined data set 700 after the modeling computing system 420 outputs a trained model 900. Further, the model definition 410 can be provided by an external computing system 409. That same external computing system 409 (or a separate external computing system) can also examine the model evaluation data 408 to, for example, determine whether the trained model 900 performs acceptably well, or to modify the model definition 410 in response to the model evaluation data 408.

Here, the modeling computing system 420 is described as under the control of a "third-party," but the only requirement for preserving consumer privacy is that the first organization not have access to the second organization's data or the joined data set 700. In some embodiments, the modeling computing system 420 can be under the control of the second organization, or otherwise accessible to the second organization. Further, while the description uses the term "first" and "second" computing system, the actual designation as first or second is reversible, so long as the other features are present.

FIG. 5 depicts an excerpt of a first training data set 500 in accordance with an embodiment. The first training data set 500 belongs to a first organization, and can comprise CII and behavioral attributes that are known and available to the first organization. In this example, the first training data set 500 comprises CII 510 that includes fields such as a consumer's name 511, address 512, and city of residence 513. The first training data set 500 also comprises behavioral attribute data 520, such as merchandise purchases 521, season ticket spend 522, digital subscriptions 523, digital subscription levels 524, video game minutes played 525, and fantasy page views 526. In some embodiments, the first training data set 500 can comprise the entirety of a first organization's consumer database, while in other embodiments, the first training data set 500 can be some subset thereof (such as a subset of consumers, or subset of CII/demographic/behavioral attributes). In some embodiments, the first training data set 500 can further comprise derived or calculated behavioral attributes, calculated as a function of one or more behavioral attributes, such as ratios between behavioral attributes, subdivisions of attributes into new groupings, etc.

FIG. 6 depicts an excerpt of a second training data set 600 in accordance with an embodiment. The second training data set 600 belongs to a second organization, and can comprise CII and at least one unknown behavioral attribute that the first organization would like to know for its consumers. However, that at least one unknown behavioral attribute is both unknown to the first organization, and is not directly shared by the second organization with the first organization. In some embodiments, the first organization can be prohibited from accessing or viewing the at least one unknown behavioral attribute. The second training data set 600 can similarly contain CII 610 such as consumer's name 611, address 612, and city 613. The second training data set 600 can also contain actual values for one or more behavioral attributes that are unknown to the first organization (external data 620). Here, the unknown behavioral attribute is minutes of TV viewed 621. The second training data set 600 can, as with the first training data set 500, be the entirety of the survey or panel data in the possession of a second organization, or some subset thereof (such as a subset of the panel consumers, or subset of behavioral data). In some embodiments, the second training data set 600 can contain information that the second organization is obligated to keep private (e.g. due to regulatory or contractual obligations) or does not want to share (e.g. to preserve trade secrets or for other business reasons). One example of such data is viewership panel data.

Certain companies have panels of TV viewers who agree to have their TV viewing habits monitored. Because the panel is roughly a random sample of the total TV audience, data collected from the panel can be used to estimate various metrics, like total viewership of certain TV programs. Companies that operate such panels often want to keep the identity of their panel members confidential, both to preserve the panel member's privacy, and to prevent manipulation of the survey data by, for example, targeting advertisements or other marketing at known panel members.

In order for the first organization to make use of this confidential and identifiable information in the possession of the second organization, a blind match and modeling process can be performed to provide estimates of an unknown behavioral attribute value for consumers known to the first organization. That is, on a first computer system 420 separate from, and generally inaccessible to, the first organization, the first training data set 500 in the possession of the first organization can be joined or merged 403 with the second training data set 600. Once merged, the separate computer system can train a statistical or machine learning model 405 to estimate, based on behavioral attribute values in possession of the first organization, the approximate value, or an estimate, of the unknown behavioral attribute value. The blind match can comprise exact matching on a CII attribute, fuzzy matching on one or more CII attributes, looking across multiple CII attribute values for the consumer, identifying a match if any one or a subset of attribute values match, inferring additional CII based on existing CII that is known from correlation databases (e.g. address-to-zip code), or machine learning/probabilistic models (e.g. name disambiguation).

Returning to the TV panel data example, a third-party, for example, can receive consumer data from the first and second organization, and merge the data, such that for a plurality of consumers, the matched data contains behavioral attribute values known to the first organization, and TV viewership data, such as minutes of sports watched. Based on the assumption that TV viewership habits are correlated with data in the possession of the first organization, a statistical or machine learning model can be trained on the merged data to estimate TV viewership based on known behavioral attribute values.

Behavioral attributes, both in the first training data set 500 and second training data set 600 can take a variety of forms. In some embodiments, behavioral attribute values can comprise dollar amounts, such as shop purchase 521, or season ticket spend 522. In some embodiments, behavioral attribute values can comprise Boolean data, such as whether the user has a digital subscription 523. In some embodiments, behavioral attribute values can comprise categorical data, such as digital subscription level 524, which can take multiple values. In some embodiments, such categorical data can be ordered (e.g., small, medium, large) or un-ordered (e.g., favorite team, state of residence, etc.). In some embodiments, behavioral attribute values can be simple numerical values, such as video game minutes played 525 or fantasy page views 526. In some embodiments, behavioral attribute values can be compound data objects, such as arrays, structures, maps, or similar that have multiple values accessible by key, index, or similar (not depicted). For example, a behavioral attribute value can comprise shop transaction data, which is an array of individual transactions. Each transaction can comprise a transaction date, amount, a list of items purchased, or other data. An example of a compound data object is shown below, illustrated in JSON format:

```
[
    {
        "transactionDatetime": "2018-01-01T16:11:02",
        "location": "Atlanta, GA",
        "totalValue": 50.00,
        "items": [
            {
                "type": "T-Shirt",
                "team": "Atlanta Falcons",
                "size": "XL"
                "cost": 25.00
            },
            {
                "type": "T-Shirt",
                "team": "Atlanta Falcons".
                "size": "M"
                "cost": 25.00
            },
        ]
    },
    {
        "transactionDatetime": 2017-06-01T12:16:38,
        "location": "New York, NY",
        "totalValue": 50.00,
        "items": [
            {
                "type": "Jersey",
                "team": "NY Jets".
```

-continued

```
            "size": "XL"
            "cost": 25.00
        },
        ]
    }
]
```

The first training data set 500 and the second training data set 600 are combined in a join/merge step 403. In some embodiments of the present disclosed technology, at least one consumer's data must exist in both the first training data set 500, and the second training data set 600. In other words, the CII for at least one consumer in the first training data set 500 must correspond to the CII for at least one consumer in the second training data set 600. For example, in first training data set excerpt 500, the bottom five users 530 are identical to the top five users 630 in the second training data set excerpt 600.

This correspondence need not be an exact match on one particular attribute, but the processor performing the join/merge step 403 must be capable of correlating the consumer's information in the first training data set 500 and the second training data set 600. This correlation can comprise exact matching on a CII attribute, fuzzy matching on one or more CII attributes, looking across multiple CII attribute values for the consumer, identifying a match if any one or a subset of attribute values match, inferring additional CII based on existing CII that is known from correlation databases (e.g. address-to-zip code), or machine learning/probabilistic models (e.g. name disambiguation). Numerous techniques are known to a person of ordinary skill in the art, any of which can be used to perform the correlations.

Figures 7, 8:
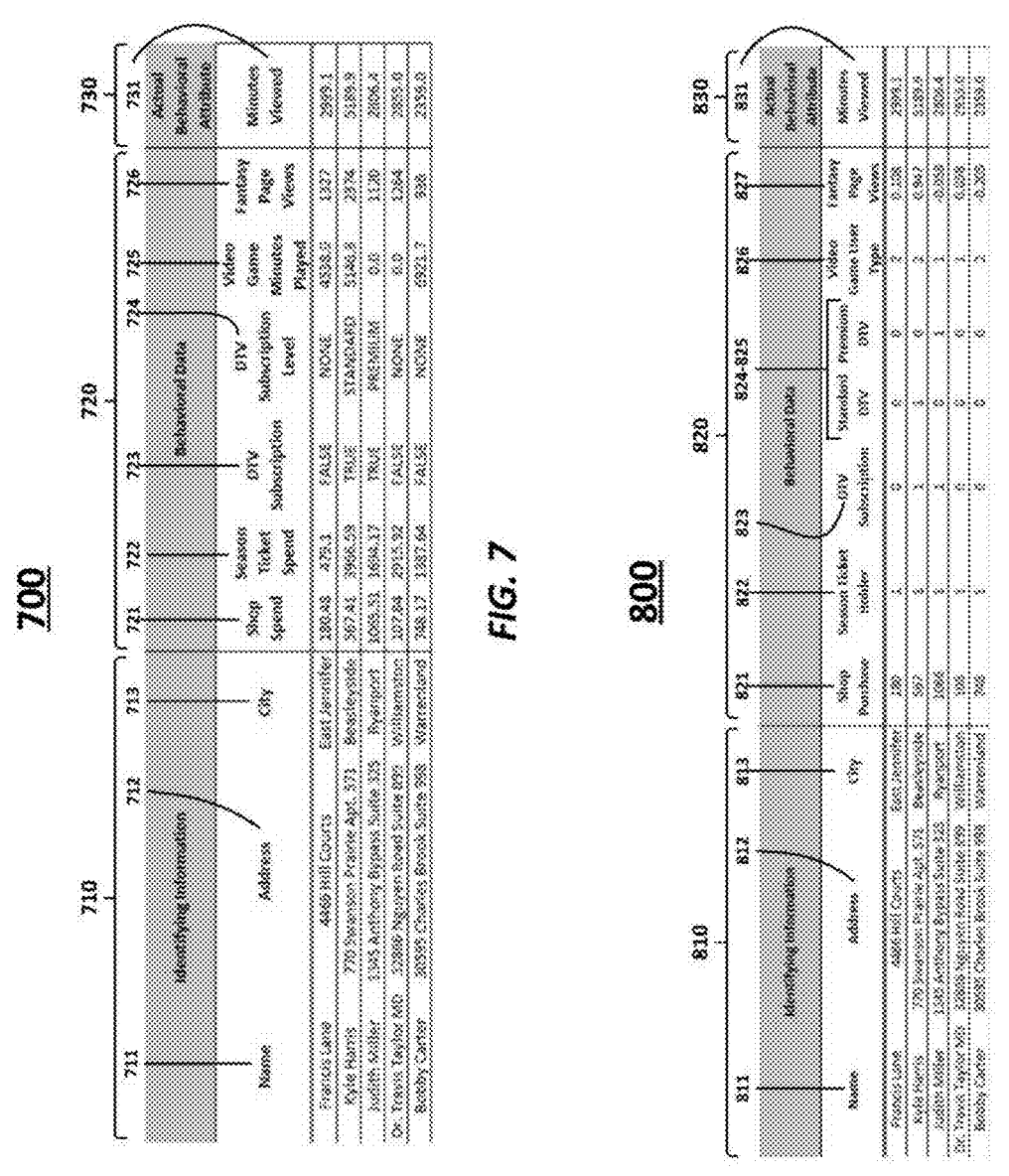

The result of the join/merge step 403 is a joined data set 700. FIG. 7 depicts a joined data set excerpt 700 in accordance with an embodiment. The joined data set 700 can comprise CII for each consumer successfully correlated between the first training data set 500 and second training data set 600, the known behavioral attributes of the first organization, and the unknown behavioral attributes that are known to the second organization. For example, as depicted in FIG. 7, the first training data set 500 is joined with the second training data set 600 to produce records 5-9 of the joined data set 700. Each row corresponds to a consumer that is present in both the first training data set 500 and second training data set 600. As would be recognized by a person of ordinary skill in the art, this can be referred to as an "inner join." The joined data set 700 comprises, for each consumer therein, CII 710, known behavioral attribute values 720, and actual behavioral attribute 730. This joined data set 700 can then be used to produce a trained model 900 to estimate the unknown behavior attribute values for consumers. In addition, the joined data set 700 can be destroyed by the third-party to preserve consumer privacy once the trained model 900 is produced and meets the performance standards of the first organization.

Once the joined data set 700 is produced, a model training 405 process is performed to produce an estimator model. The model training 405 process can comprise two steps. The first is a vectorization step which converts the values in the joined data set 700 into a simple numeric representation suitable for training an estimator model. The second step is to train the estimator model on the vectorized data. Vectorization of the data can comprise applying one or more rules to one or more attributes in the joined data set 700. In some embodiments, vectorization rules can comprise encoding rules, feature selection rules, standardization rules, and dimensionality reduction rules. However, as would be recognized by a person of ordinary skill in the art, each of these categories of steps may be omitted in certain circumstances. For example, if all behavioral values are already numeric, no encoding is necessary. Or if models produced without standardization or dimensionality reduction are computationally feasible, and provide adequate performance, those rules are unnecessary.

Encoding steps convert one or more attribute values into a format suitable for statistical analysis. FIG. 8 depicts an example of encoding steps and vectorized data 800 that comprises identifying information 810, vectorized behavioral data 820, and an actual behavioral attribute 830 that has been vectorized. For example, if the attribute has an ordinary numeric value, such as minutes viewed 831, dollars spent based on shop purchases 821, page views, etc., the number can be used as-is (or simply cast to an appropriate data type, e.g. integers, doubles, etc.). Alternatively, such numeric values can be binned or binarized. For example, if the distribution of minutes watched per month of TV runs from 0 to 500, the distribution could be binned into groups of 100 (e.g. bin 0: 0-100, bin 1: 101-200, bin 2: 201-300, bin 3: 301-400, bin 4: 401-500), and encoded into bin position (e.g. 55 minutes=>0, 198 minutes=>1). Another example of binned numeric values is shown in FIG. 8 as video game user type 826. Each video game user is placed in a specific bin based on the video game minutes played 725 included in the joined data set 700. Binarization is a special case of binning with two bins, where a threshold value is determined, and values are encoded as either 0 for below the threshold, or 1 for above the threshold (e.g. with a threshold of 250 minutes, 0 if below, 1 if above). For example, as depicted in FIG. 8, if the consumer is a season ticket holder 822 and purchased a digital subscription 823, then the vectorized value would be 1 for both behavioral attributes. Conversely, if the consumer is not a season ticket holder and did not purchase a digital subscription, then the vectorized value would be 0 for both behavioral attributes.

If the attribute is ordered categorical data (e.g. small/medium/large, standard/premium/ultimate), the categorical data can be encoded as an integer value indicating its position. For example, if the value is T-shirt size, and possible sizes are small, medium, and large, the vectorization rule could convert small to 0, medium to 1, and large to 2. If the attribute is un-ordered categorical data (e.g. favorite team, state of residence, etc.), the vectorization rule can be a one-hot encoding rule, such that each potential value of categorical data is represented as an additional attribute, and the attribute value is either a 0 if it does not correspond to the value, or 1 if it does. For example, as depicted in FIG. 8, one-hot encoding was used on the digital subscription level 724 included in the joined data set 700 to determine whether a consumer purchased (e.g. value of 1) or did not purchase (e.g. value of 0) a standard digital subscription 824 or a premium digital subscription 825. The attributes can also be vectorized into standard deviations from a mean value. For example, as depicted in FIG. 8, the number of fantasy page views 827 for each consumer is vectorized into a standard deviation from the mean value of fantasy page views 726 included in the joined data set 700.

If the attribute is a compound data object, such an array, structure, map, or similar indexed/keyed data structure, the vectorization rule can be a function to perform on the data to extract a numeric value, such as picking a particular value from the structure, or calculating a statistic based on the structure. For example, if the attribute was merchandise transactions, the attribute value might be an array of transactions, each one with a date and a transaction amount. The vectorization rule can be total merchandise sales, which would sum all the transactions amounts. The vectorization rule could also be merchandise sales in the last thirty days, in which case the vectorization rule could analyze the transactions, extract just those having a transaction date in the last thirty days, and then sum the transaction amounts.

In some embodiments, the vectorization rules can produce multiple output columns for one or more input columns. For example, a single numeric value can be vectorized into a first column by using the numeric value directly and into a second column as a bin number. Alternatively, a vectorized column can be vectorized as a ratio or comparison between multiple input columns (e.g. whether more minutes of video games are played than page views).

The vectorization rules can also comprise standardization rules to standardize, scale, center, or perform other statistical numeric transformations. Such transformations can include scaling the values to a range (e.g. normalization between 0 and 1), centering on average value, scaling to a known distribution (e.g. Gaussian distribution), filling in missing data (e.g. either a zero or a computed value such as an average value), or eliminating outliers (e.g. data beyond a certain distance, such as number of standard deviations, from the mean).

The vectorization rules can also comprise dimensionality reduction techniques. As is known in the art, machine learning and statistical estimation often suffers from the "curse of dimensionality," having too many dimensions or degrees of freedom to feasibly calculate. Therefore, vectorization can, in some embodiments, comprise dimensionality reduction techniques, such as principal component analysis (PCA), non-negative matrix factorization (NNMF), and latent Dirichlet allocation (LDA), and other techniques known in the art.

The vectorization rules can also comprise feature selection criteria. In some embodiments, not all behavioral attribute values are used in model training 405. In general, it is desirable for the selected behavioral attribute values to be highly correlated with the target unknown, but not highly correlated with each other. From the original behavioral attribute values, certain attributes can be included or excluded based on industry expertise or hypotheses about correlations in the data. For example, if fantasy participation is uncorrelated with TV viewership (the target unknown behavioral attribute), then the fantasy participation attribute values can be dropped. In some embodiments, after behavioral attribute values are encoded, the values can be analyzed to determine whether input behavioral attribute values are highly correlated. Using multiple highly correlated input values can increase the computational complexity of training the model without meaningfully improving performance. One method of eliminating correlated data is to calculate a correlation coefficient between each pairwise set of behavioral attribute values, aggregating behavioral attributes into groups or categories of correlated behavioral attribute values, and then dropping all but one or a few of the correlated behavioral attribute values in each of the groups of correlated behavioral attribute values. This correlation coefficient-based technique can be applied at any stage of the vectorization process, either to the raw behavioral attribute values, encoded behavioral attribute values, or standardized behavioral attribute values.

Figure 9:
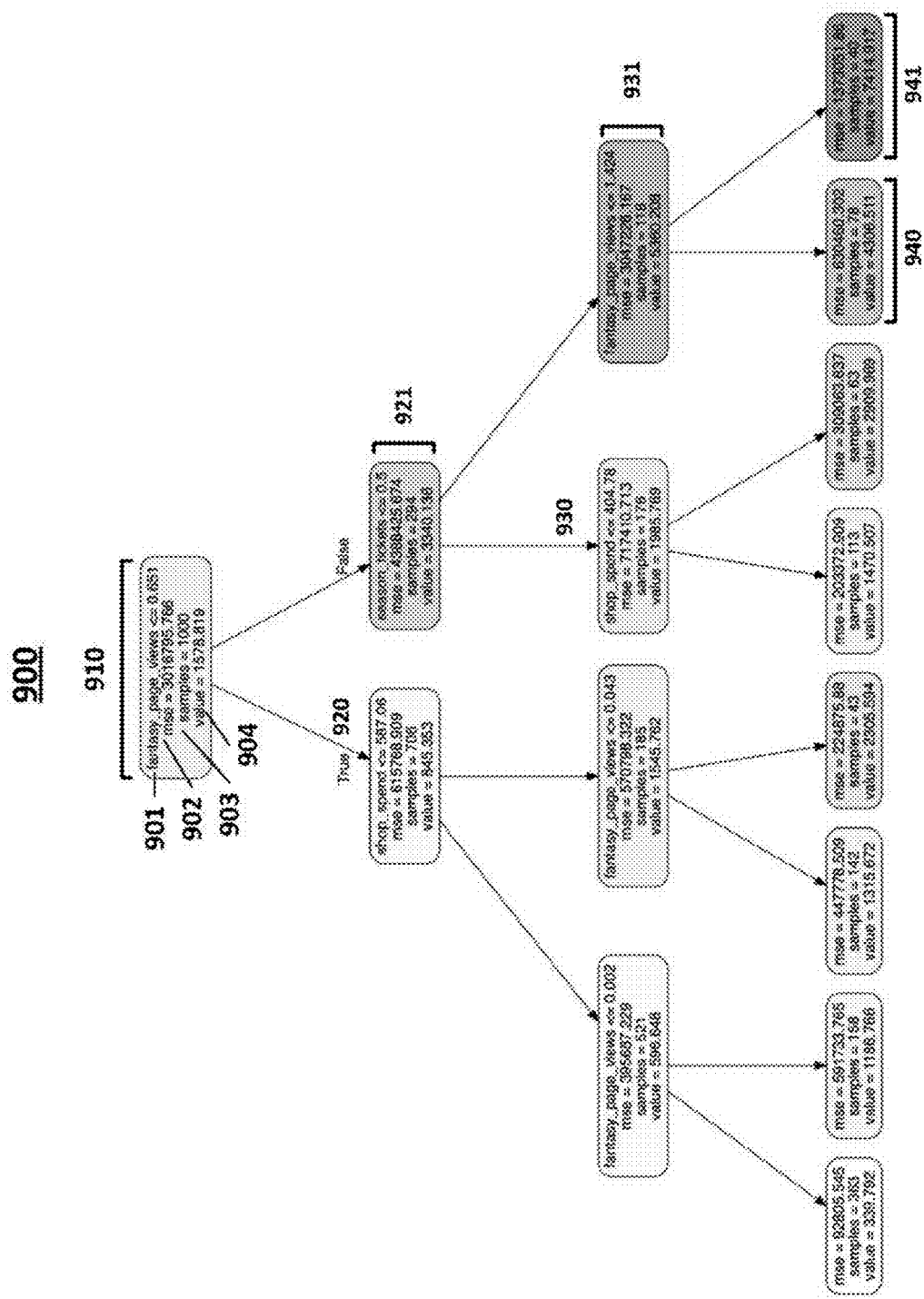
FIG. 9 depicts an example of a trained model in the form of a decision tree in accordance with an embodiment.

Once the data is vectorized, it can be used to train an estimator model. The estimator model can comprise a trainable model, such as a machine learning, logistic, probabilistic, or statistical model. Examples of trainable models include artificial neural networks, automatically produced decision trees, support vector models, and other similar models. Trainable models can comprise regression models that estimate a continuous (or semi-continuous) variable as a function of inputs. In some embodiments, the estimator model can comprise a decision tree. In some embodiments, the trained model could also include one or more of a support-vector model (SVM), an artificial neural network (ANN), a least absolute shrinkage and selection operator (LASSO), and an elastic net regression, logistic regression, probabilistic regression (e.g. Bayesian regression), or other trainable regression model. The decision tree produces numerous decision points, and ultimately provides estimates of the unknown behavioral attribute value for each consumer in the first training data set 500. The decision tree can be trained using a training method such as an Iterative Dichotomizer (ID), a Classification and Regression Tree (CART), an Automatic Interaction Detector (AID), a Chi-Squared Automatic Interaction Detector (CHAID), a Conditional Inference Tree, Multivariate Adaptive Regression Splines technique (MARS), or other decision tree training methodology, as would be known to a person of ordinary skill in the art. FIG. 9 depicts an example of a CART training technique, where the target variable can take a discrete set of values. In CART structures, the leaves represent class labels and the branches represent conjunctions of features that lead to those class labels.

In order to preserve consumer privacy, the model training 405 step uses a model definition 410 provided from an external computing system 409. In this way, the first organization can control the external computing system 409, and use it to provide a model definition 410. At the same time, the first organization cannot directly access the joined data set 700, which contains sensitive CII data from the second training data set 600. In some embodiments, the model definition 410 can comprise information sufficient to produce a trainable estimator model (e.g. executable code to produce it in memory, an identification of the model), and any relevant parameters for the model. In some embodiments, the model definition 410 can further comprise vectorization rules, such as where no vectorization is performed prior to joining the first training data set 500 and second training data set 600. In some embodiments, the first training data set 500 and second training data set 600 can be vectorized before they are joined to produce the joined data set 700, and then the model definition 410 need only comprise information sufficient to create a trainable estimator model. The model definition 410 can take a variety of forms, including, for example, computer source code or object code, configuration files, or other build artifacts. In some embodiments, for example, the model definition 410 could be a SAS proc file, a python script, or other computer program. In some embodiments, the computer system that executes the model training 405 can provide a user interface, such as a REST API, website, or graphical user interface to allow a model to be defined.

The model training 405 then outputs a trained model 900 by training the defined model 410 on at least a portion of the joined data set 700. For example, to facilitate training and validation, the joined data set 700 can be split into a training and testing subset, and the model trained only on the training set. Subsets of the joined data set 700 can be provided in other ways, such as k-folds splits, shuffles, mini-batches, etc. The model is then trained in accordance with the training method appropriate for the defined model. For example, if the model is a decision tree, the model training 405 can implement a Classification and Regression Tree algorithm (CART) algorithm, Automatic Interaction Detector (AID), or a Chi-Squared Automatic Interaction Detector (CHAID) algorithm, as is known in the art. As another example, if the model is an artificial neural network, the training can comprise a form of Stochastic Gradient Descent with Backpropagation, or other training method as is known in the art.

FIG. 9 depicts a decision tree 900 in accordance with an embodiment. Where the defined model is a decision tree, the resulting trained model 900 can be visualized as the tree 900. This decision tree 900 is a regression tree that produces an estimated value 904 based on applying one or more rules 901. FIG. 9 depicts a regression tree. A regression tree 900 can be used to estimate a value or in this case an unknown behavioral attribute value. As depicted in FIG. 9, a regression tree 900 can comprise class labels 901, performance metric 902, samples 903, and value 904. Regression tree 900 builds a regression model based on a target variable, in this case the unknown behavioral attribute value, using each independent variable. As regression tree 900 splits, internal nodes denoting a test on an attribute are created and branches stem from each internal node that represent the outcome of the test.

As depicted in FIG. 9, the class labels 901 can comprise the behavioral attribute values included in the first training data set 500 and the value 904 is the dependent variable. The value 904 can comprise the unknown behavioral attribute value that the first organization desires to estimate for each consumer in the first training data set 500. As depicted in FIG. 9, the unknown behavioral attribute value or the value 904 is the number of minutes watched by each consumer. The performance metric 902 used in FIG. 9 is the mean squared error. As the tree progresses, the mean squared error decreases and indicates a more accurate estimation of the unknown behavioral attribute value for each consumer.

To produce an estimated TV viewership using this tree, a computer system begins at the root node 910 for each consumer, and evaluates the rule for the consumer. In this example, the first rule 901 is whether the total fantasy page views is <=0.651 (e.g. the number of fantasy page views is 0.651 standard deviations above the mean). If the rule is met by the data associated with a consumer, the computer moves down the tree along the "true" branch for that rule 920. The process repeats until the computer arrives at a terminal node such as the bottom-right terminal node 941. For example, if a consumer has the following attributes:

| Attribute | Vectorization Format | Value |
| --- | --- | --- |
| Fantasy Page Views | Standard deviations from mean | 1.5 |
| Season Tickets | Binarized (1-season ticket holder, 0-not) | 1 |
| Shop Spend | Dollars rounded to nearest dollar | 500 |

The computer would evaluate the first node or the root node 910, and determine that the consumer's fantasy page views are not less than 0.651 standard deviations above the mean, and advance to the right, down the false branch to false node 921. The computer would then evaluate whether the value for season tickets is less than 0.5 (alternatively, whether the value is a 0 or a 1), and move down the false branch to parent node 931. The computer would then evaluate whether the fantasy page views were less than or equal to 1.424, which is false, moving to the bottom-right terminal node 941. As shown, in the training examples, there were 40 examples that would match this same route through the decision tree, and the average viewership numbers for those 40 samples would be 7414 minutes/year. The computer would therefore assign a TV viewership metric of 7414 for the consumer with the attributes above.

In some embodiments, a decision tree can be an effective choice for the trained model 900. Decision trees frequently work well for training on few training examples, produce explainable rule sets that can be understood by humans and evaluated for reasonableness (as compared to, for example, a very large matrix of weights for a neural network). Decision trees can also be adjusted prior to application against unseen examples. For example, in the decision tree depicted in 900, the bottom-right terminal node 941 consists of only 40 of the 1000 training examples used to train this decision tree. Such a small number of examples may indicate that these are unrepresentative outliers. Thus, the bottom-right terminal node 941 can be "pruned" and removed from the tree altogether, also eliminating the other bottom-right terminal node 940 sharing the common parent node 931. Thus, the pruned terminal nodes' parent node 931 becomes a new terminal node. As depicted, the parent node 931 consists of 118 training examples, or a little over 10% of the training examples. With the parent node 931 as a terminal node, consumers whose behavioral attributes arrive at that node are assigned a viewership value of 5360.2. This pruning process can be performed manually, or the model definition may specify a minimum terminal node size, either in absolute terms or as a percentage of the size of the training set.

Figure 10:
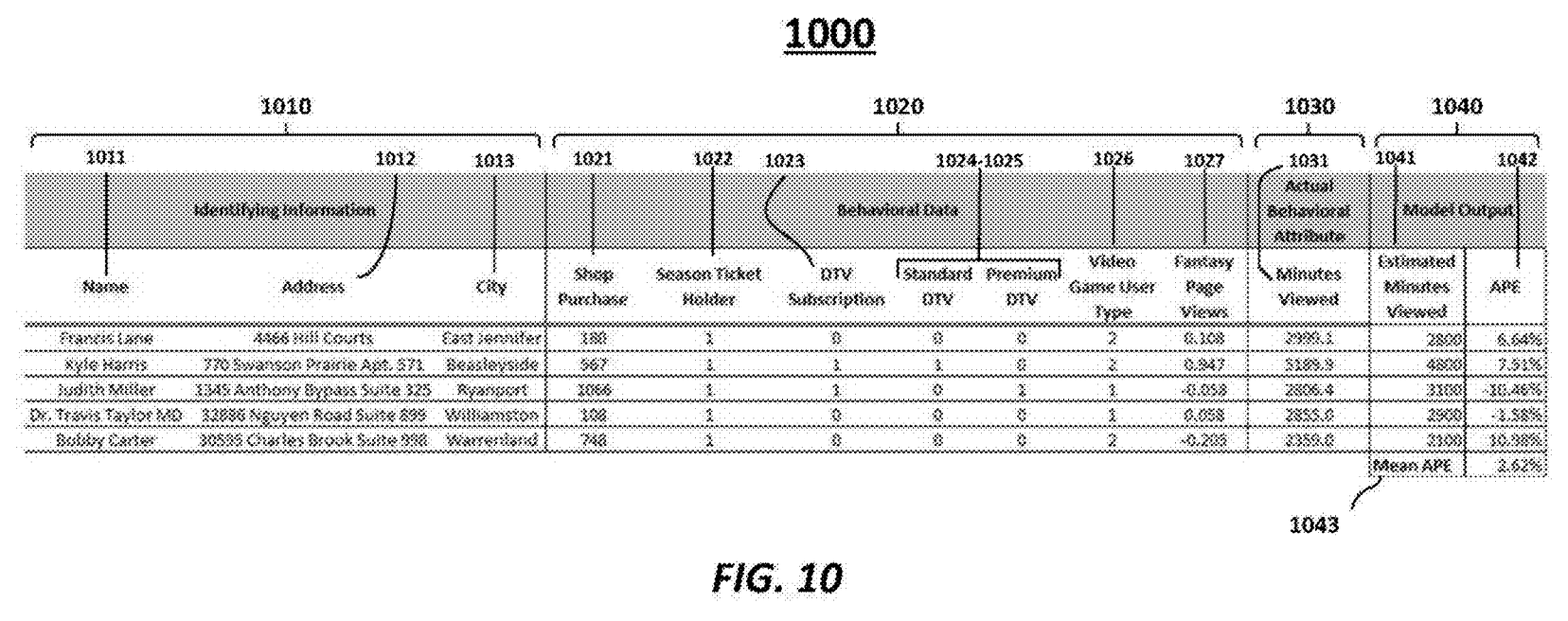

FIG. 10 depicts validation data 1000 for a trained model 900 in accordance with an embodiment. To validate the trained model 900, the trained model 900 is evaluated on a plurality of consumers on the first computer system. The plurality of consumers used for validation (validation data 1000), can comprise the entirety of the joined data set 700 or a subset thereof, such as a test or validation split, one of a k-fold of the joined data set 700. The validation data 1000 can comprise at least the input normalized behavioral attributes 1020, and the actual behavioral attribute value 1030, here minutes viewed 1031. The model output 1040 is evaluated for each consumer to produce an estimated behavioral attribute value, here estimated minutes viewed 1041, and a performance metric, here Absolute Percentage Error ("APE") 1042.

To maintain privacy, and because model evaluation 407 requires access to the complete training examples, including sensitive data, the model evaluation 407 can be performed by the modeling computing system 420. In some embodiments, model evaluation 407 can comprise calculating performance metrics that compare the actual unknown behavioral attribute values to the estimated behavioral attribute values produced by the trained model 900. In some embodiments, model evaluation 407 can comprise comparing the total of the estimated behavioral attribute for a plurality of consumers to an estimate of the total of that behavioral attribute for the plurality of consumers. For example, if the total viewership of a television program is known, and the percentage of that viewership within the internal data set is known, then the total viewership for the internal data set can be estimated by multiplying the total viewership by the percentage of the viewership in the data set. That estimate of the total can be compared to the total of the estimated viewership for each individual consumer in the internal data set. In some embodiments, the performance metric can be a mean absolute error (MAE), or mean absolute percentage error (MAPE), as calculated between the estimated output value produced by the model and the actual target output value.

Other performance criteria can include accuracy measures, such as calculations of average error, variance, or other measurements related to the distribution of estimated output values. Performance criteria can also include compute performance criteria, such as the number of training epochs necessary to produce the model, time to evaluate the model on new input data, etc. Performance criteria can also relate to explainability or generalization criteria, such as, for example, with decision tree models, terminal node size. The evaluation criteria may be determined by the organization controlling the modeling computing system 420, or the first organization. In some embodiments, in the same way that model definitions 410 are provided from the external computing system 409, evaluation criteria can also be provided by the external computing system 409. Once the evaluation criteria is calculated by the modeling computing system 420, the modeling computing system 420 can deliver the evaluation data to the second computing system. The evaluation data provided to the modeling computing system 420 can comprise both the estimates and the per-consumer error. For example, the validation data 1000 represent the estimates as estimated minutes viewed 1041 and the per-consumer error as APE 1042. In some embodiments, to further preserve privacy and prevent reverse-engineering of the actual behavioral attributes 1030, the evaluation data 408 provided to the modeling computing system 420 can comprise only aggregate evaluation data 408, such as mean APE 1042 across all validation examples.

If the first organization is not satisfied with the evaluation data 408, the first organization can use the external computing system 409 to redefine the model 410 to attempt to improve performance, such as by adjusting parameters of the model, using a different model, or changing the vectorization rules. If the first organization is satisfied with the evaluation data 408, then the first organization can apply the trained model 900 to the first training data set 500 using its own computing system to estimate the unknown behavioral attribute value. During the blind data modeling process 400, the first organization cannot access the second training data set 600 or the joined data set 700. Similarly, the second organization cannot access the first training data set 500 or the joined data set 700. The "blind" creation of the trained model 900 preserves each consumer's CII, but allows the first organization to estimate an unknown behavioral attribute value for each of its consumers included in the first training data set 500. Alternatively, the first organization can provide the third-party modeling computing system 420 with a plurality of different model definitions 410 and receive multiple evaluation data 408 and performance statistics back at the same time. Then the first organization can pick the best model.

Because training examples can be reverse-engineered from trainable computer models in certain circumstances, some embodiments include countermeasures to prevent reverse-engineering training examples from the model. For example, where a decision tree is used, if the tree is fully grown, such that each terminal node comprises a single training example, it may be possible to reverse-engineer from the model the actual values of the target value for each consumer in the training set. To prevent this reverse-engineering, the modeling computing system 420 can enforce requirements on the models. For example, if the model is a decision tree, the first computer can enforce a minimum terminal node size.

With these estimated behavioral attribute values, the first organization can enhance each consumer's experience on the first organization's website, tailor advertisements and marketing campaigns that can reduce the time a consumer spends searching for a product or service, and improve loyalty programs for its consumers. For example, if the NFL can estimate whether a consumer participates in fantasy, then it could provide the consumer with advertisements tailored to fantasy participation. As an additional example, the NFL can use a trained model to estimate the number of minutes each consumer watched NFL games on TV or the Internet, or the number of minutes a consumer watched a specific NFL team during the NFL season on TV or the Internet.

The NFL can use the number of minutes watched by each consumer to categorize the consumers into groups that can help the NFL provide the consumer with relevant products. Alternatively, if the NFL had a loyalty program that provided its consumers with perks for purchasing from products, tickets, subscriptions, or passes, then the NFL could provide the consumer with perks tailored to each consumer's unknown behavioral attribute. Prior to the conception of the present disclosed technology, sports leagues, like the NFL, could not acquire this information. Overall, the addition of this unknown behavioral attribute can increase a sports league's understanding of its fans, can improve a fan's experience by offering the fan products, programs, subscriptions, tickets, and ads that are tailored to that fan's behavioral attributes, and reduce the time it takes a fan to search for products, programs, subscriptions, and tickets that relate to the fan's team or a specific sports league.

Once the first organization receives a satisfactory trained model 900, it can apply the model to consumer data using its own computing system within its own first-party data 1101 to estimate the unknown behavioral attribute for each consumer in its first-party data 1101. Because the input behavioral attributes used to train the model 900 are also present in the first-party data 1101, the trained model 900 is compatible with the first-party data 1101.

Figure 11:
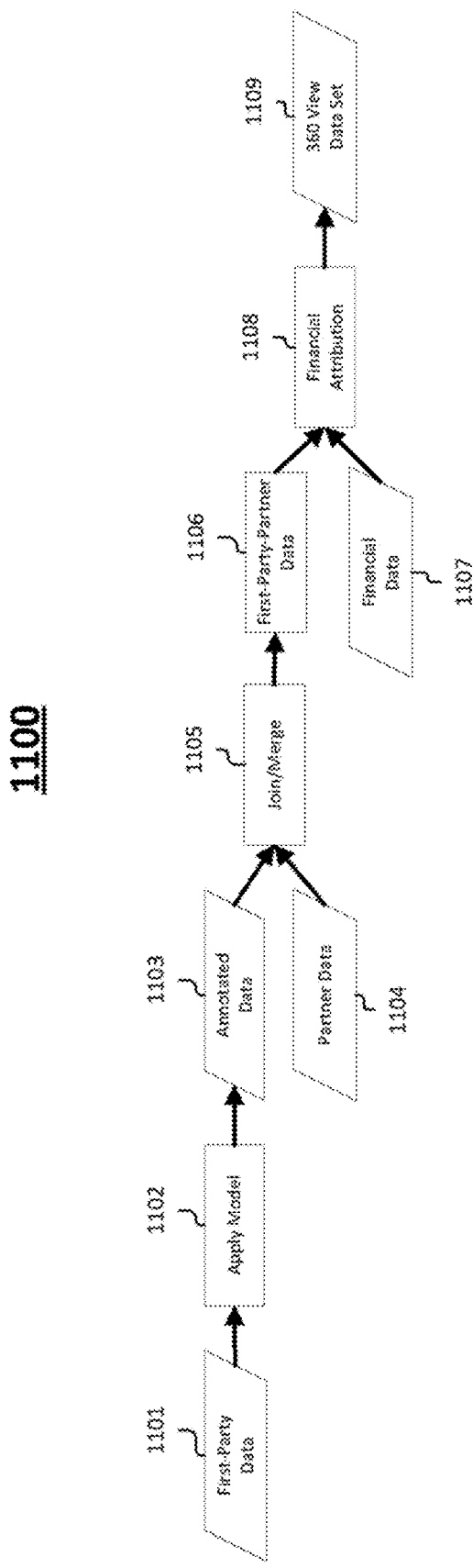
FIG. 11 depicts a block diagram of a 360-View architecture in accordance with an embodiment.

FIG. 11 is a flow diagram for a method of producing a 360-View 1100 in accordance with an embodiment. The first organization can further use the trained model 900 as a part of producing a 360-View of its consumers or a 360-View data set 1109. A 360-View of a consumer is an aggregation of all or substantially all behavioral attributes, in addition to CII, demographic, and other kinds of information for each consumer. The 360-View is intended to provide a comprehensive view of how each consumer is interacting with the organization's products and services, as well as the products and services of other affiliated, related, or cooperative organizations able to share consumer data. That is, in addition to first-party data 1101, additional information can be either provided directly by partners who are willing and able to share consumer data (partner data 1104), or estimated using a trained model 1102 as explained above.

The first-party data 1101 belongs to a first-party, and can comprise CII and behavioral attributes that are known and available to the first-party. For example, the first-party is the first organization that requested the blind data modeling 400 and received the trained model 900. Additionally, in order for the first-party to make use of the trained model 900, the first-party data 1101 should be the same data set as the first training data set 500. That is, the first-party data 1101 and the first training data set 500 include the same CII and behavioral attributes that were used during the blind data modeling 400 to train the trained model 900. At a minimum, the first-party data 1101 should include the CII and behavioral attributes used to train the trained model 900. Applying the trained model 900 to an alternative data set that was not used to train the trained model 900 could produce inaccurate and misleading estimations of the unknown behavioral attribute values of each consumer included in the first-party data 1101. For the foregoing reasons, an example of the first-party data 1101 is illustrated in the data set excerpt 500 in FIG. 5. The first-party data 1101 is the primary data source used to construct the 360-View data set 1109.

After the first-party receives the trained model 900, it can apply the model 1102 to the first-party data 1101 to output annotated data 1103. The first-party receives the model via an input from a graphic user interface or on a source code or object code file and uploads the input to a computer that also stores the first-party data 1101. The model estimates an unknown behavioral attribute value for each consumer based on each consumer's behavioral attribute values contained in the first-party data 1101 and outputs annotated data 1103.

As a practical example, the NFL can apply a trained model developed during the blind data modeling 400 to estimate how many minutes each consumer watches NFL games each year. The model may estimate that a consumer that purchased an NFL Sunday Ticket subscription and Los Angeles Rams season tickets watches more minutes of the NFL season than a consumer that did not purchase a Sunday Ticket subscription or season tickets. As yet another example, a model may estimate that a consumer that plays a substantial number of minutes of the Madden NFL video game watches more minutes of the NFL season than a consumer that does not own or play the Madden NFL video game. Alternatively, the estimated unknown behavioral attribute can comprise minutes viewed of an NBA, MLB, NHL, or MLS game. Applying the model to the first-party data 1101 results in the output of the annotated data 1103.

The annotated data 1103 can comprise the first-party data 1101 (i.e. CII and behavioral attributes for each consumer) and an estimated unknown behavioral attribute value for each consumer. The annotated consumer data 1103 is similar to the joined data set 700 as illustrated in FIG. 7, but instead of the actual behavioral attribute, the annotated data set 1103 includes an estimated or predicted attribute value for each consumer. Additionally, as depicted in FIG. 7, the joined data set 700 only includes those consumers that were identified in both the first training data set 500 and the second training data set 600. The annotated data 1103 can include all of the consumers from the first training data set 500, or in this case the first-party data 1101, because the model can estimate the unknown behavioral attribute for each consumer. Actual behavioral attribute values for each consumer are unnecessary because the model can generate reliable estimations of each consumer's unknown behavioral attribute value. This expanded data set is important to capture the behaviors of as many consumers as possible and to provide a sufficient amount of data to create robust, definitive, and useful clustering groups during segmentation 330.

The first party can further expand the annotated data 1103 by joining or merging 1105 the annotated data 1103 with partner data 1104. The partner data 1104 belongs to third parties and can comprise, for one or more consumers, CII sufficient to identify the consumer, demographic information, and one or more partner behavioral attributes values for one or more partner behavioral attributes. These third parties can include partners, subsidiaries, affiliates, franchisees, or any other party that can legally share its partner data 1104 without violating a consumer's privacy rights.

Unlike the second training data set 600 included in the blind data modeling 400, the first-party can legally and contractually access the partner data without violating a consumer's CII. Typically, the first-party will enter into a contract with a partner that permits the sharing of the partner data 1104, including the CII, the demographic information, and partner behavioral attribute values of each consumer. Additionally, the partner has likely made an agreement with its consumers that allows the partner to share the CII, demographic information, and behavioral attribute values for each consumer. Preferably, some of the consumers included in the partner data 1104 are also included in the annotated data 1103.

Figure 12:
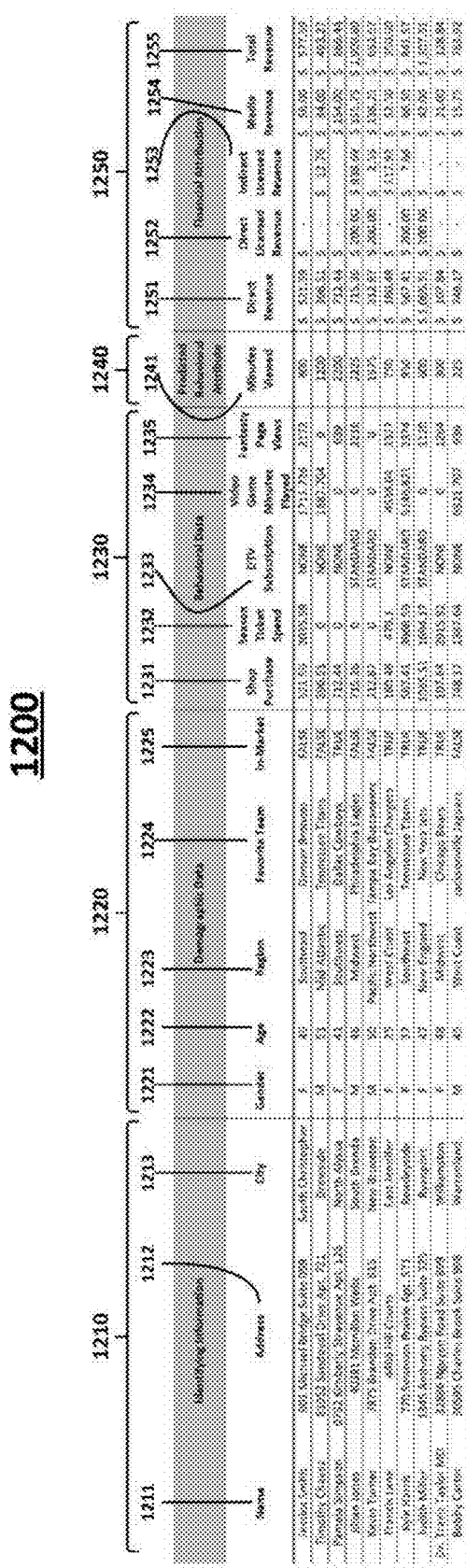
FIG. 12 depicts an example of a 360-View data set in accordance with an embodiment.

Additionally, the partner data 1104 or first-party data 1101 can comprise demographic information about each consumer. An example of demographic information from partner data 1104 is illustrated in the 360-View data set excerpt 1200. As illustrated in FIG. 12, in some embodiments, demographic data 1220 can comprise simple numerical values, such as age 1222. In some embodiments, demographic data 1220 can comprise categorical data, such as the consumer's gender 1221, the region 1223 where the consumer is from, and the consumer's favorite team 1224.

The partner data 1104 can also comprise one or more partner behavioral attribute values for one or more partner behavioral attributes. In some embodiments, the partner behavioral attribute values can comprise dollar amounts, such as shop purchase 1231. Shop purchase 1231 can comprise the amount of money a consumer spent on one or more categories of products (e.g., pizza, clothing, or shoes). In some embodiments, the partner behavioral attribute values can comprise simple numerical values, such as video game minutes played 1234, or fantasy page views 1235. In some embodiments, partner behavioral attribute values can comprise Boolean data, such as whether the user has a digital subscription 1233, a music subscription, or accounts on specific websites like ESPN or the NFL's website. In some embodiments, the partner behavioral attribute values can comprise categorical data, such as digital or music program subscription level, which can take multiple values.

In some embodiments, the first-party data 1101 can include the partner data 1104. In some embodiments, including the partner data 1104 in the first-party data 1101 may increase the performance of a trained model created during the blind data modeling process 400. For example, increasing the number of consumers considered during the training of a trained model may improve the reliability and accuracy of the trained model because it has more information to consider about each consumer. Alternatively, the partner data 1104 may comprise, for one or more consumers, one or more of the same behavioral attribute values for one or more behavioral attributes included in the first-party data 1101. In this embodiment, the partner data 1104 can increase the accuracy of the first-party data 1101. Accordingly, the blind data modeling process 400 would likely generate a more accurate and reliable trained model 900. If the partner data 1104 is included in the first-party data 1101, then the first-party does not have to perform the join or merge 1105 step during the construction of the 360-View because the partner data 1104 is already included. In a further embodiment, the first-party could decide not to join or merge 1105 the partner data 1104 with the first-party data 1101 or the first-party may not have access to partner data 1104 to join or merge 1105 with the first-party data. However, as previously mentioned, the inclusion of the partner data 1104 may allow the first-party to create more definitive clusters during segmentation 330.

Joining or merging the first-party data 1101 and the partner data 1104 outputs first-party-partner data 1106. At this point, the first-party could perform segmentation 330 to cluster its consumers based on their behavioral attribute values, unknown behavioral attribute values, demographic information, and partner behavioral attribute values.

In some embodiments, a first-party can use its financial data 1107 to calculate financial attribution 1108 values for each consumer included in the first-party-partner data 1106. This financial attribution 1108 is a mechanism for attributing a particular dollar amount of revenue or profit to each consumer and aggregating all sources of revenue or profit for that consumer. Such sources of revenue can come in a variety of forms. As depicted in FIG. 12, non-limiting examples of these forms are direct revenue 1251, direct licensed revenue 1252, indirect licensed revenue 1253 or sponsorship revenue, and/or media revenue 1254.

Direct revenue 1251 is revenue collected directly by the first-party from a consumer. Direct revenue 1251 can be, for example, membership fees in fan clubs, digital access subscriptions, etc. Calculating direct revenue 1251 can be as simple as summing the value of all direct revenue transactions. For example, in FIG. 12, direct revenue 1251 is determined by the amount of money a consumer spent on shop purchase 1231 and season ticket spend 1232.

Direct licensed revenue 1252 is revenue that results from a license with a third-party or affiliate. An example of direct licensed revenue 1252 would be the sale of licensed merchandise, from which the first-party receives a royalty. Direct licensed revenue can be calculated by multiplying each licensed transaction or event by the relevant royalty rate. For example, in FIG. 12, if the licensed transaction is a digital subscription 1233 that costs $400, and the relevant royalty rate is ten percent (50%), then the direct licensed revenue is $200.00. Thus, if a consumer purchased a digital subscription 1233, then $200.00 of direct licensed revenue would be attributed to that consumer.

Media revenue 1254 is a share of a media contract revenue attributed to each consumer. In general, organizations like sports leagues or other media companies enter into agreements to sell licensed content for a lump sum to distributors, such as TV networks, movie studios, or digital streaming services. In order to get a 360-View that includes media revenue 1254 attributable to each consumer, there must be an estimate of (1) total consumption of the media, and (2) consumption of that media by each consumer. As depicted in FIG. 12, the consumption of the media by each consumer is the number of minutes viewed 1241 and the total consumption of the media is the total number of minutes viewed 1241 by every consumer. Alternatively, as depicted in FIG. 12, the consumption of media by each consumer could be the number of video game minutes played 1234 by each consumer and the total consumption of the media could be the total number of video game minutes played 1234. Estimates of total consumption are often available from survey companies, or directly from media distributors. Consumption of media by each consumer can be determined by acquiring consumption data from distributors (such as view counts or minutes viewed from digital streaming services), or using a trained model 900, as explained above. The media revenue attributable to each consumer is then calculated simply as:

$$\text{attributable revenue} = \text{total revenue} * \frac{\text{Consumer Consumption}}{\text{Total Consumption}}$$

Sponsorship revenue, or indirect licensed revenue 1253, is a share of sponsorship or advertising revenue attributed to each consumer. Organizations often receive revenue from third parties for advertising or sponsorship. However, organizations would like to be able to attribute the value of sponsorship deals to each individual consumer. There are a variety of ways of performing such attribution. For example, the simplest attribution would be to take the sponsorship value and divide it by the total number of consumers in the organization's consumer database. In some embodiments, sponsorship revenue attribution can be calculated by estimating the total number of consumers (including those outside the consumer database) using survey data, dividing the sponsorship agreement revenue by the total number of consumers, and attributing an equal share to all consumers in the database. In some embodiments, sponsorship revenue attribution can be calculated by dividing consumers into a "target" group and a "non-target" group, based on behavioral or demographic data. Many sponsors have target demographics for their advertising and sponsorship, and are primarily interested in advertising to certain segments of the organization's consumers. Thus, the revenue can be first distributed between "target" and "non-target" groups (e.g. a 70%/30% split), subdivided into the total number of consumers in each group (in-database, or total), and then attributed to each consumer. In some embodiments, the total sponsorship revenue can be allocated only to target consumers (e.g. a 100%/0% split).

Techniques for attributing sponsorship revenue can also be combined with techniques for estimating media viewership. For example, if the sponsorship agreement is tied to a specific distribution channel, then the sponsorship revenue can be attributed only to those consumers who participate in the distribution channel, either equally or proportional to their consumption of the media.

While the above calculations discuss attributing revenue from various channels to specific consumers, a similar process can be performed for attributing margin, or profit, to individual consumers. In embodiments that attribute margin to each consumer, each revenue number above is adjusted downward in proportion to the overhead associated with each revenue source (e.g. cost of goods, administrative costs, third-party contractor expenditures, etc.).

Once a 360-View is produced, the organization can use the 360-View in various business analytics such as clustering the consumers in the 360-View into groups, calculating and evaluating return on investment, developing targeted acquisition or retention campaigns, or determining the lifecycle and life-stage of behavioral attribute values for each consumer.

One application of the 360-View is to automatically group consumers into relevant market segments. Therefore, some embodiments of the disclosed technology further comprise applying a clustering algorithm to consumer data, such as the 360-View, to group consumers according to behavior. By grouping consumers this way, organizations can focus outreach and marketing efforts on groups of similar users that may respond in similar ways. Within groups, the grouping can be used for targeted advertising to consumers whose interactions with the organization's products and services vary from their group norms, with the assumption that the consumer is likely to be interested in that activity. Segmentation 330 allows an organization to create strategic marketing campaigns, target retention campaigns, enhanced experiences for each consumer, tailored advertising for each consumer, and financial planning based on the clustering results.

In order for such an automatic segmentation mechanism to function, consumers must be divided into groups, where each member of the group is relatively similar to others in the group, and is relatively dissimilar from members of other groups. A variety of techniques exist for clustering data in this manner. Automatic clustering algorithms that are known in the art include k-Means, Affinity Propagation, Mean Shift, Spectral Clustering, Ward Clustering, Agglomerative Clustering, DBSCAN, Birch, and Gaussian Mixture. Each of these techniques first require as input a plurality of points in n-dimensional space, similar to the trained models explained above. Two candidate algorithms that tend to be particularly well suited for consumer segmentation include mini batch K-means and Agglomerative Clustering, both of which have complexities between $O(n \log n)$ and $O(n^2)$.

Figure 13:
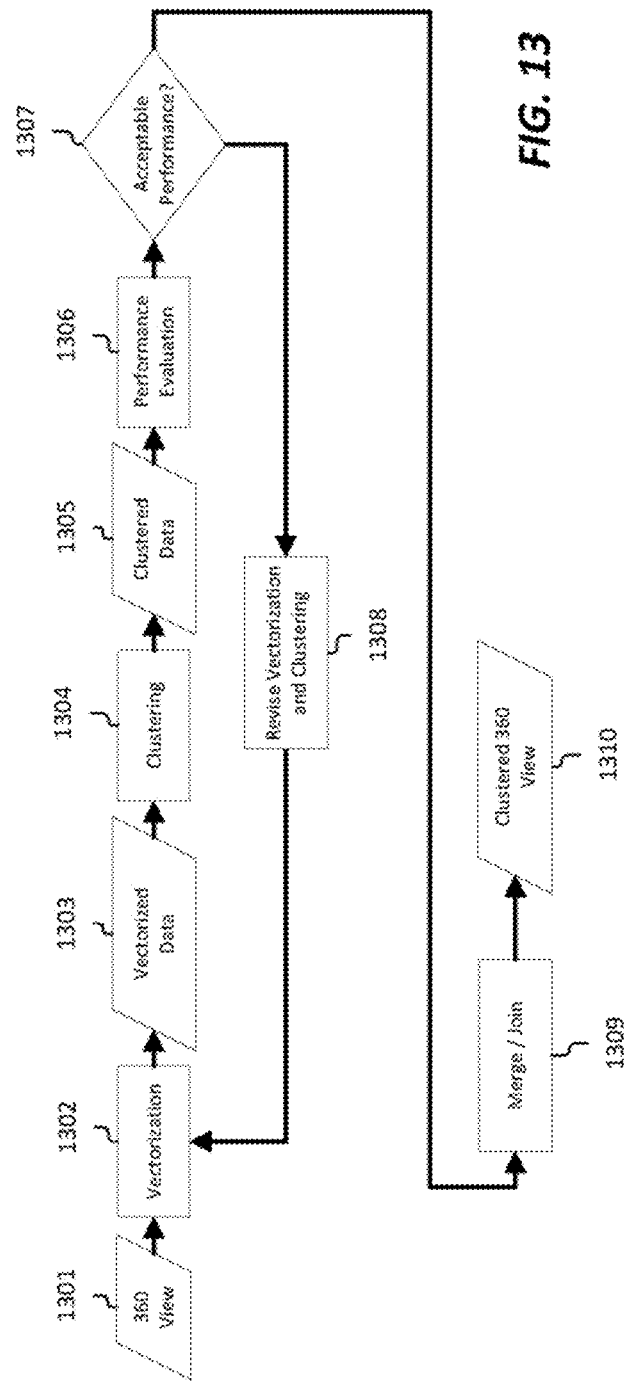
FIG. 13 depicts a block diagram of a clustering architecture in accordance with an embodiment.

FIG. 13 depicts a clustering process 1300 in accordance with an embodiment. To perform automatic segmentation, the data in the 360-View 1301 must be vectorized 1302 according to a plurality of vectorization rules. These vectorization rules can be any of the vectorization rules discussed above as applied to the joined data set 700. For clarity, the same vectorization rules need not be used, but a new combination of vectorization rules comprising the same kinds of rules can be used as is described above. Conceptually, each vector representing a consumer is effectively a point in n-dimensional space, where n is the size of the vector, and the clustering algorithm is intended to group points in similar regions of space together. The result of this process is groupings of consumers who are similar.

Next, clustering 1304 is performed. This comprises applying a clustering algorithm (as explained above) to the vectorized data 1303. In some embodiments, the clustering algorithm can be provided a predetermined number of groups into which to subdivide the consumers. In some embodiments, the number of groups can be programmatically selected by repeating the clustering algorithm with various numbers of groups, and evaluating the quality of the clusters (as described herein), and selecting a number of groups that provides the best performance. Many clustering algorithms, likewise, can use various distance measures to evaluate the quality of individual clusters. While the default in most circumstances is Euclidean distance (e.g. straight line distance), many other distance metrics can be used, such as squared Euclidean distance, standardized Euclidean distance, cosine distance, Manhattan distance, Bray-Curtis distance, Canberra distance, Chebyshev distance, Jensen-Shannon distance, Mahalanobis distance, Minkowski distance, and other distance metrics as are known in the art.

Once a set of vectorization rules, algorithm, and distance metric the algorithm can be executed to cluster consumers 1305 into the desired number of groups. The result is a set of cluster IDs 1305 for consumers in the 360-View 1301. The clusters can then be evaluated 1306 to ensure adequate performance. Evaluation criteria can include, for example, determining the average density of each cluster, distortion (mean sum of squared distances to centers), intercluster distances, calculating the Variance Ratio Criterion (Calinski Harabaz score), calculation of a silhouette score (mean ratio of intra-cluster and nearest-cluster distance), or other similar metrics. These performance criteria can be compared to a minimum or maximum acceptable value. Alternatively, the clustering can be repeated using different vectorization rules, algorithms, desired number of groups, and/or distance measures, and the scores recalculated to see if they improve or worsen. Techniques for such evaluation can also comprise generating an elbow chart (e.g. mapping one or more fit scores/computational performance metrics against choices for number of groups), silhouette visualizations, or inter-cluster distance maps.

Figure 14:
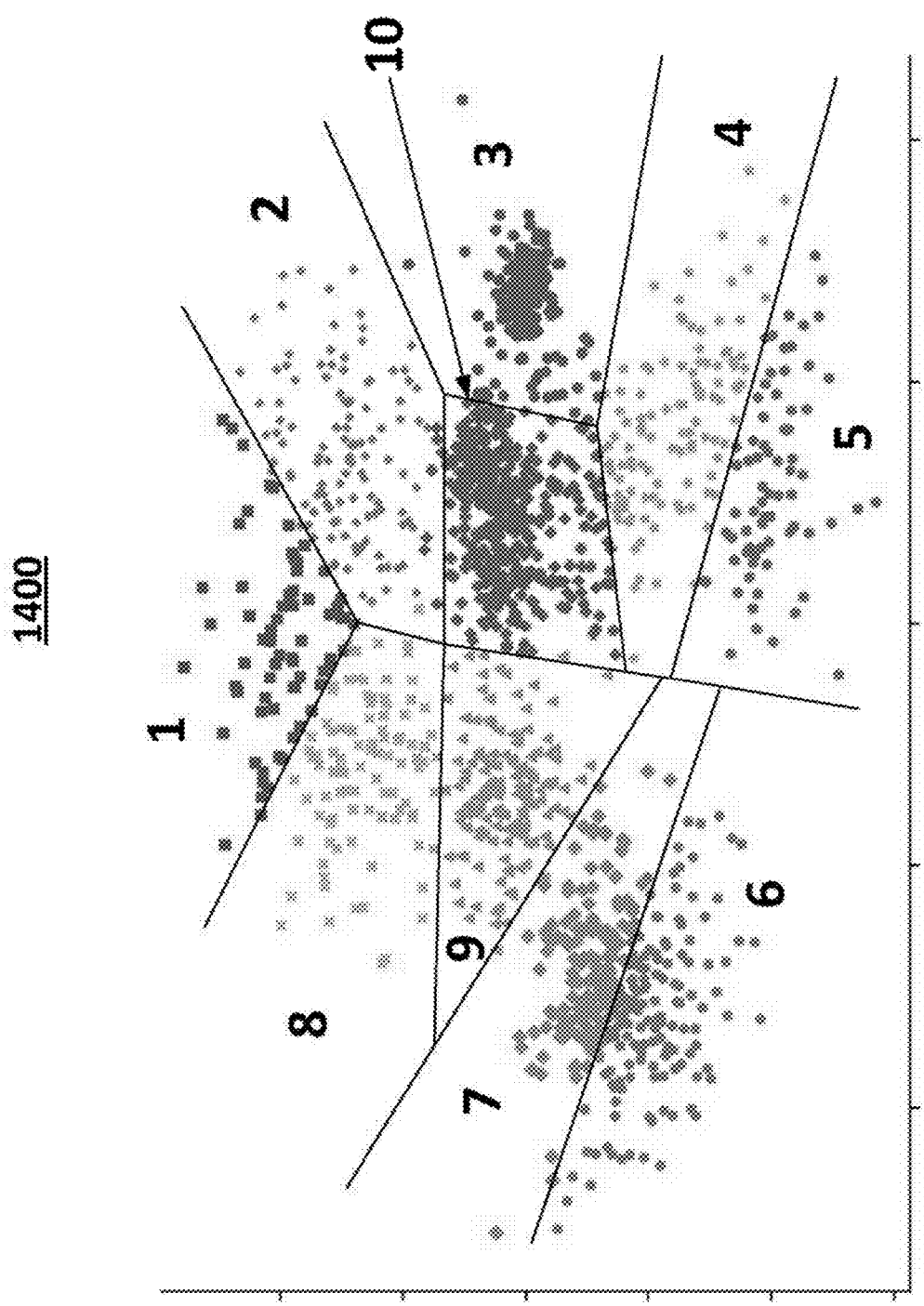
FIG. 14 depicts an example of a cluster output in the form of k-means clustering in accordance with an embodiment.

FIG. 14 depicts a visualization 1400 of clustering in accordance with an embodiment. For example, FIG. 14 illustrates projecting the vectorized data into two dimensions, by, for example performing PCA analysis, t-Distributed Stochastic Neighborhood Embedding (t-SNE), or other dimensionality reduction technique to reduce highly dimensional data into two dimensions. Each data point in visualization 1400 represents a consumer. This example used k-Means clustering to subdivide an example data set into 10 segments. The consumers in each segment are indicated in a different shaped point, and boundaries between the groupings are indicated. As can be seen, the algorithm groups the data into homogenous clusters that are decently separated from one another. Different groupings can have relatively better, or worse performance. For example, segments 7 and 6 appear to subdivide a single dense grouping of consumers into two segments, which may indicate that the data has been divided into too many segments. In contrast, segment 3 is clearly identified and shows a high degree of homogeneity within the cluster.

If the performance is acceptable 1307, the clustered data can be merged/joined 1309 with the 360-View data 1301 to produce a clustered 360-View 1310. Alternatively, if the clustering method did not produce adequate clusters, the clustering process can be revised 1308 with different sets of parameters (e.g. different number of desired groups, different vectorization rules, inclusion/exclusion of behavioral attributes or derived/calculated behavioral attributes, different clustering algorithm, etc.).

The result of executing the algorithm is a group ID associated with each consumer in the consumer database, which can be merged or joined 1309 to the 360-View 1301 to produce a clustered 360-View 1310. FIG. 15 depicts a segmented 360-View in accordance with an embodiment. As with the 360-View 1200 depicted in FIG. 12, the data further includes clustering data 1560, comprising an ID number 1560 indicating the segment the user belongs to.

An organization can use the clustered 360-View 1310 to improve marketing strategies, enhance consumer experiences, provide consumers with tailored advertisements to reduce consumer search time for products or services, and decrease advertising or marketing costs. Segmentation 1560 can also help organizations develop a long-term plan regarding its consumers and how best to serve them over a period of years. Finally, segmentation 1560 can help an organization focus its business development, its product development, the services it provides, and the relationships it has with its consumers.

Figure 16:
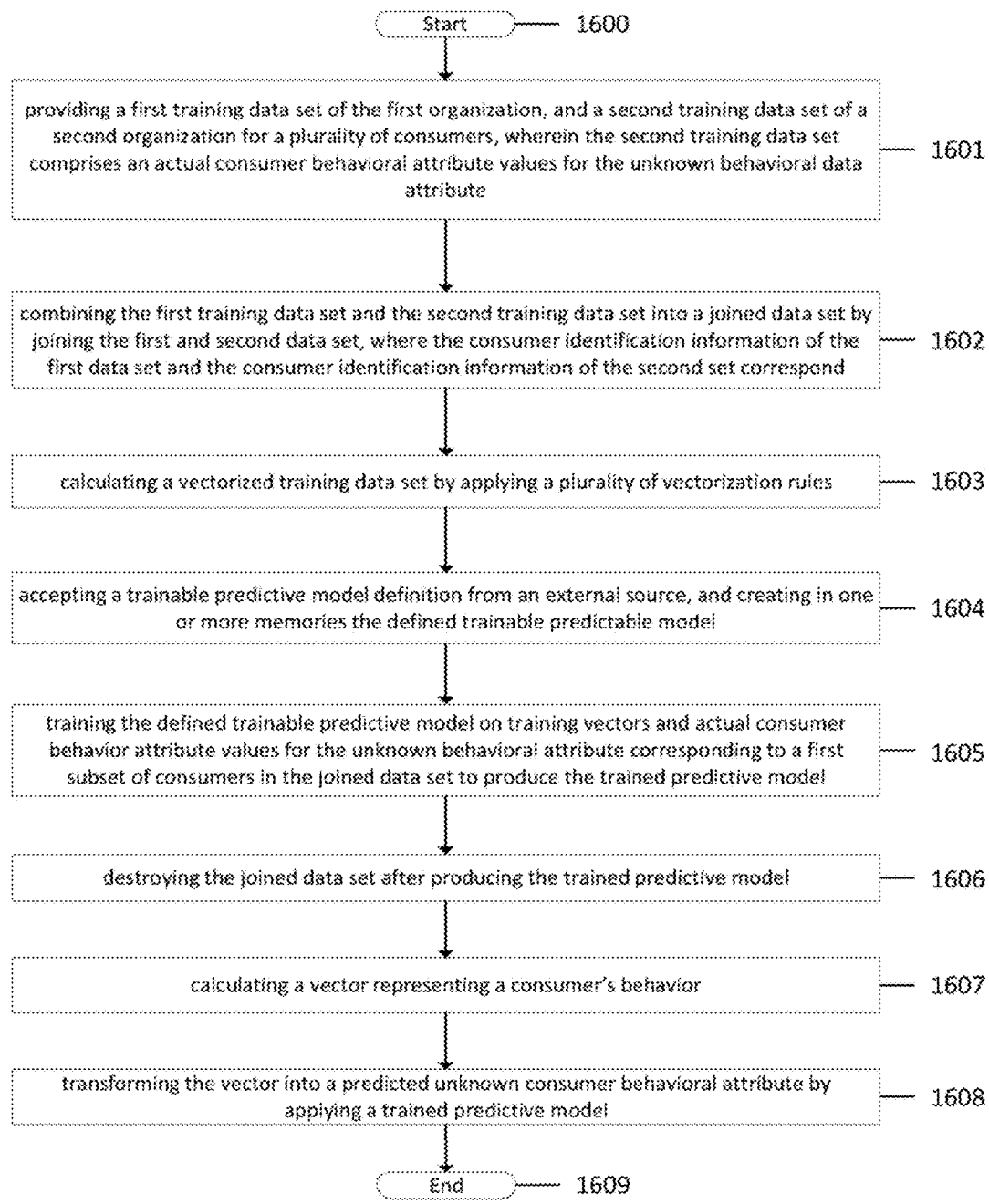
FIG. 16 depicts a flow chart of a blind data modeling and the creation of a 360-View data set in accordance with an embodiment.

FIG. 16 depicts a method 1600 in accordance with an embodiment. In some embodiments, the method can comprise providing a first training data set of the first organization, and a second training data set of a second organization for a plurality of consumers, wherein the second training data set comprises an actual consumer behavioral attribute values for the unknown behavioral data attribute 1601. In some embodiments, the method can further comprise combining the first training data set and the second training data set into a joined data set by joining the first and second data set, where the common identifying information of the first data set and the common identifying information of the second set correspond 1602. In some embodiments, the method can further calculating a vectorized training data set by applying a plurality of vectorization rules 1603. In some embodiments, the method can further comprise accepting a trainable predictive model definition from an external source, and creating in one or more memories the defined trainable predictable model 1604. In some embodiments, the method can further comprise training the defined trainable predictive model on training vectors and actual consumer behavior attribute values for the unknown behavioral attribute corresponding to a first subset of consumers in the joined data set to produce the trained predictive model 1605. In some embodiments, the method can further comprise destroying the joined data set after producing the trained predictive model 1606. In some embodiments, the method can further comprise calculating a vector representing a consumer's behavior 1607. In some embodiments, the method can comprise transforming the vector into a predicted unknown consumer behavioral attribute by applying a trained predictive model 1608. In some embodiments, the trained predictive model can be used by the first organization to predict an unknown consumer behavior for each consumer in the first training data set while protecting consumer privacy 1609.

Figure 17:
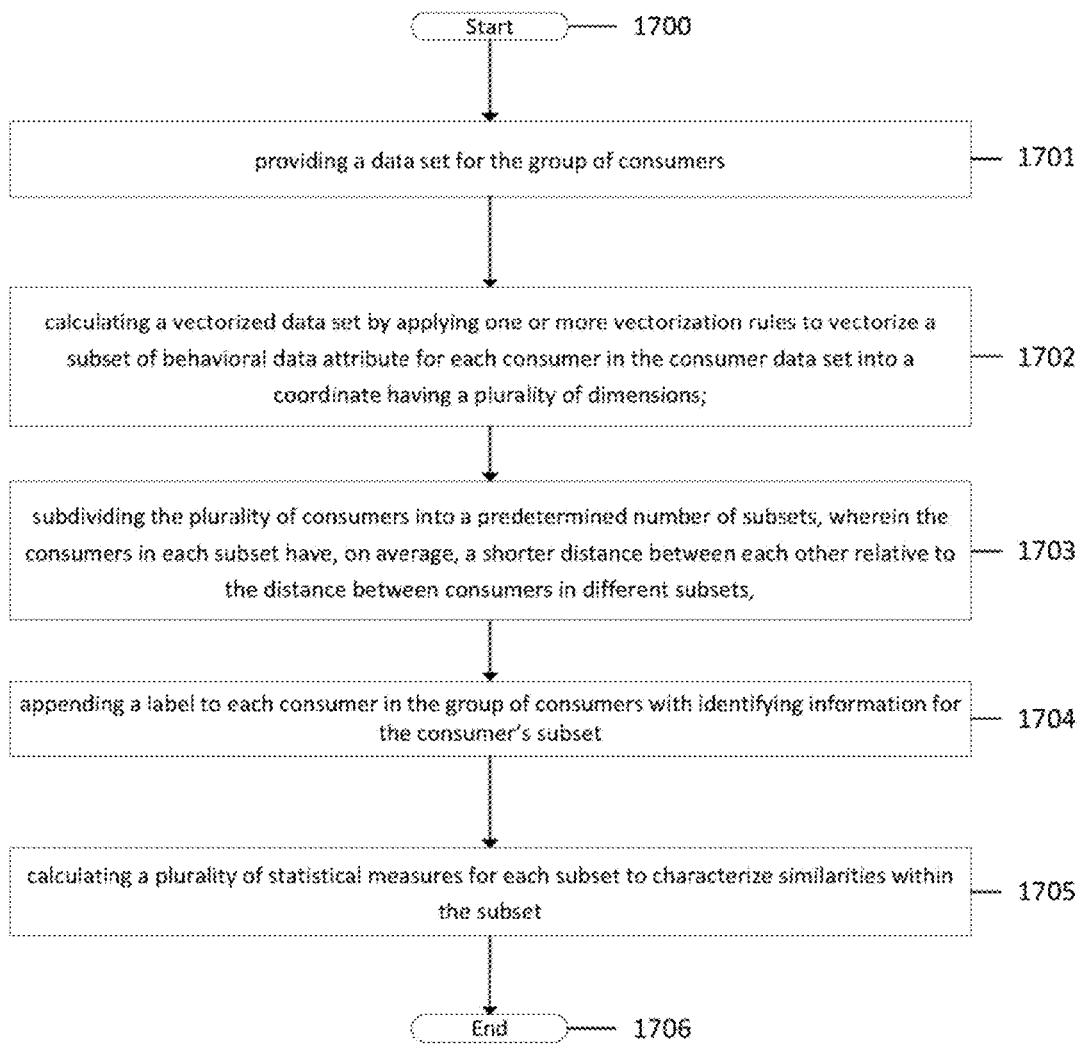
FIG. 17 depicts a flow chart of a segmentation of a 360-View data set in accordance with an embodiment.

FIG. 17 depicts another method 1700 in accordance with an embodiment. In some embodiments, the method can comprise providing a data set for the group of consumers 1701. In some embodiments, the method can further comprise calculating a vectorized data set by applying one or more vectorization rules to vectorize a subset of behavioral data attribute for each consumer in the consumer data set into a coordinate having a plurality of dimensions 1702. In some embodiments, the method can further comprise subdividing the plurality of consumers into a predetermined number of subsets, wherein the consumers in each subset have, on average, a shorter distance between each other relative to the distance between consumers in different subsets 1703. In some embodiments, the method can further comprise appending a label to each consumer in the group of consumers with identifying information for the consumer's subset 1704. In some embodiments, the method can further comprise calculating a plurality of statistical measures for each subset to characterize similarities within the subset 1705. The method of segmenting outputs clusters or groupings of consumers based on their relative similarities 1706.

The flowchart and/or block diagrams in the Figures illustrate the architecture, functionality, and operation of possible implementations of systems, methods and computer program products according to various embodiments of the present disclosed technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present disclosed technology have been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the disclosed technology and the practical application, and to enable others of ordinary skill in the art to understand the disclosed technology for various embodiments with various modifications as are suited to the particular use contemplated.

Any flow diagrams depicted herein show just one example. There may be many variations to this diagram or the steps (or operations) described therein without departing from the spirit of the disclosed technology. For instance, the steps may be performed in a differing order or steps may be added, deleted or modified. All of these variations are considered a part of the claimed disclosed technology.

While the preferred embodiment to the disclosed technology had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method for training a model to estimate an unknown consumer behavior, comprising the steps of:

calculating, by a first computing system, a vector representing a consumer's behavior by applying one or more vectorization rules to a set of behavioral attribute values for the consumer in a data set of a first organization;

transforming the vector, by the first computing system, into an estimated unknown consumer behavioral attribute value by applying a trained model, wherein the model was trained by:

providing, to a second computing system separate from the first computing system:

a first training data set of the first organization for a plurality of consumers, wherein the training data set comprises, for each consumer, identification information, and a set of behavioral attribute values, and a second training data set of a second organization for a plurality of consumers, wherein the second training data set comprises, for each consumer, identification information, and actual behavioral attribute values for the unknown behavioral data attribute, combining, by the second computing system, the first training data set and the second training data set into a joined data set by joining the one or more behavioral data attribute values of the first data set and the actual behavior attribute values for the unknown behavioral attribute of the second data set, for each consumer, where the common identifying information of the first data set and the common identifying information of the second set correspond, calculating, by the second computing system, a vectorized training data set by applying the one or more vectorization rules to vectorize the set of behavioral attribute values for each consumer in the joined data set into a set of training vectors, accepting, by the second computing system, a trainable model definition from an external source, wherein a trainable model defined by the trainable model definition accepts a training vector as input, and produces an estimated unknown behavioral data attribute as an output, creating in one or more memories of the second computing system the defined trainable model, and training, by the second computing system, the defined trainable model on the training vectors corresponding to a first subset of consumers in the joined data set to produce the trained model.

2. The method of claim 1, wherein training the model further comprises:

validating, by the second computing system, the trained model by transforming each training vector in a second subset of consumers in the joined data set into an estimated unknown behavioral data attribute, comparing the estimated unknown behavioral data attribute to the actual behavioral attribute value to produce a performance metric, and determining whether the performance metric falls within a predetermined range of acceptable performance values, wherein the first subset of consumers and the second subset of consumers is mutually exclusive.

3. The method of claim 1, wherein the trained model is a decision tree, and wherein the step of training the defined trainable model further comprises pruning each terminal node of the decisions tree wherein the terminal node includes fewer than a predetermined number of consumers, or a predetermined percentage of the total number of consumers.

4. The method of claim 1, wherein the set of behavioral attributes of the first training data set is a subset of available behavioral attributes, wherein the set of behavioral attributes are selected such that each behavioral attribute in the set of behavioral attributes is substantially statistically independent.

5. The method of claim 4, wherein each behavioral attribute in the first training data set was selected by:

evaluating the statistical independence of each pair of available behavioral attribute values for consumers in a consumer data set comprising available behavioral attribute values for a plurality of consumers, aggregating the available behavioral attributes into substantially statistically independent subsets of behavioral attributes, and selecting one behavioral attribute from each substantially statistically independent subset of behavioral attributes.

6. The method of claim 4, wherein the first organization has not been provided the second training data set of the second organization, and the joined data set.

7. The method of claim 4, wherein training the model further comprises the step of validating the trained model by calculating the sum of the estimated unknown consumer behavior for all consumers in a consumer data set, and comparing the sum to an estimated total behavior.

8. The method of claim 1, wherein training the model further comprises the step of destroying the joined data set.

9. A computing system for training a model to estimate an unknown consumer behavior, the computing system comprising:

one or more memories having computer readable computer instructions; and one or more processors for executing the computer readable computer instructions to perform a method comprising:

calculating, by a first computing system, a vector representing a consumer's behavior by applying one or more vectorization rules to a set of behavioral attribute values for the consumer in a data set of a first organization;

transforming the vector, by the first computing system, into an estimated unknown consumer behavioral attribute value by applying a trained model, wherein the model was trained by:

providing, to a second computing system separate from the first computing system:

a first training data set of the first organization for a plurality of consumers, wherein the training data set comprises, for each consumer, identification information, and a set of behavioral attribute values, and a second training data set of a second organization for a plurality of consumers, wherein the second training data set comprises, for each consumer, identification information, and actual behavioral attribute values for the unknown behavioral data attribute, combining, by the second computing system, the first training data set and the second training data set into a joined data set by joining the one or more behavioral data attribute values of the first data set and the actual behavior attribute values for the unknown behavioral attribute of the second data set, for each consumer, where the common identifying information of the first data set and the common identifying information of the second set correspond, calculating, by the second computing system, a vectorized training data set by applying the one or more vectorization rules to vectorize the set of behavioral attribute values for each consumer in the joined data set into a set of training vectors, accepting, by the second computing system, a trainable model definition from an external source, wherein a trainable model defined by the trainable model definition accepts a training vector as input, and produces an estimated unknown behavioral data attribute as an output, creating in one or more memories of the second computing system the defined trainable model, and training, by the second computing system, the defined trainable model on the training vectors corresponding to a first subset of consumers in the joined data set to produce the trained model.

10. The computing system of claim 9, wherein training the model further comprises:

validating, by the second computing system, the trained model by transforming each training vector in a second subset of consumers in the joined data set into an estimated unknown behavioral data attribute, comparing the estimated unknown behavioral data attribute to the actual behavioral attribute value to produce a performance metric, and determining whether the performance metric falls within a predetermined range of acceptable performance values, wherein the first subset of consumers and the second subset of consumers is mutually exclusive.

11. The computing system of claim 9, wherein the trained model is a decision tree, and wherein the step of training the defined trainable model further comprises pruning each terminal node of the decisions tree wherein the terminal node includes fewer than a predetermined number of consumers, or a predetermined percentage of the total number of consumers.

12. The computing system of claim 9, wherein the set of behavioral attributes of the first training data set is a subset of available behavioral attributes, wherein the set of behavioral attributes are selected such that each behavioral attribute in the set of behavioral attributes is substantially statistically independent.

13. The computing system of claim 12, wherein each behavioral attribute in the first training data set was selected by:
   evaluating the statistical independence of each pair of available behavioral attribute values for consumers in a consumer data set comprising available behavioral attribute values for a plurality of consumers,
   aggregating the available behavioral attributes into substantially statistically independent subsets of behavioral attributes, and
   selecting one behavioral attribute from each substantially statistically independent subset of behavioral attributes.

14. The computing system of claim 9, wherein the first organization has not been provided the second training data set of the second organization, and the joined data set.

15. The computing system of claim 9, wherein training the model further comprises the step of validating the trained model by calculating the sum of the estimated unknown consumer behavior for all consumers in a consumer data set, and comparing the sum to an estimated total behavior.

16. The computing system of claim 9, wherein training the model further comprises the step of destroying the joined data set.

17. One or more non-transitory computer-readable storage media containing machine-readable computer instructions that, when executed by a computing system, performs a method for training a model to estimate an unknown consumer behavior, comprising the steps of:
   calculating, by a first computing system, a vector representing a consumer's behavior by applying one or more vectorization rules to a set of behavioral attribute values for the consumer in a data set of a first organization;
   transforming the vector, by the first computing system, into an estimated unknown consumer behavioral attribute value by applying a trained model, wherein the model was trained by:
      providing, to a second computing system separate from the first computing system:
         a first training data set of the first organization for a plurality of consumers, wherein the training data set comprises, for each consumer, identification information, and a set of behavioral attribute values, and
         a second training data set of a second organization for a plurality of consumers, wherein the second training data set comprises, for each consumer, identification information, and actual behavioral attribute values for the unknown behavioral data attribute,
      combining, by the second computing system, the first training data set and the second training data set into a joined data set by joining the one or more behavioral data attribute values of the first data set and the actual behavior attribute values for the unknown behavioral attribute of the second data set, for each consumer, where the common identifying information of the first data set and the common identifying information of the second set correspond,
      calculating, by the second computing system, a vectorized training data set by applying the one or more vectorization rules to vectorize the set of behavioral attribute values for each consumer in the joined data set into a set of training vectors,
      accepting, by the second computing system, a trainable model definition from an external source, wherein a trainable model defined by the trainable model definition accepts a training vector as input, and produces an estimated unknown behavioral data attribute as an output,
      creating in one or more memories of the second computing system the defined trainable model, and
      training, by the second computing system, the defined trainable model on the training vectors corresponding to a first subset of consumers in the joined data set to produce the trained model.

18. The one or more non-transitory computer-readable storage media of claim 17, wherein training the model further comprises:
   validating, by the second computing system, the trained model by transforming each training vector in a second subset of consumers in the joined data set into an estimated unknown behavioral data attribute, comparing the estimated unknown behavioral data attribute to the actual behavioral attribute value to produce a performance metric, and determining whether the performance metric falls within a predetermined range of acceptable performance values, wherein the first subset of consumers and the second subset of consumers is mutually exclusive.

19. The one or more non-transitory computer-readable storage media of claim 17, wherein the trained model is a decision tree, and wherein the step of training the defined trainable model further comprises pruning each terminal node of the decisions tree wherein the terminal node includes fewer than a predetermined number of consumers, or a predetermined percentage of the total number of consumers.

20. The one or more non-transitory computer-readable storage media of claim 17, wherein the set of behavioral attributes of the first training data set is a subset of available behavioral attributes, wherein the set of behavioral attributes are selected such that each behavioral attribute in the set of behavioral attributes is substantially statistically independent.

21. The one or more non-transitory computer-readable storage media of claim 20, wherein each behavioral attribute in the first training data set was selected by:
   evaluating the statistical independence of each pair of available behavioral attribute values for consumers in a consumer data set comprising available behavioral attribute values for a plurality of consumers,
   aggregating the available behavioral attributes into substantially statistically independent subsets of behavioral attributes, and
   selecting one behavioral attribute from each substantially statistically independent subset of behavioral attributes.

22. The one or more non-transitory computer-readable storage media of claim 17, wherein the first organization has not been provided the second training data set of the second organization, and the joined data set.

23. The one or more non-transitory computer-readable storage media of claim 17, wherein training the model further comprises the step of validating the trained model by calculating the sum of the estimated unknown consumer behavior for all consumers in a consumer data set, and comparing the sum to an estimated total behavior.

24. The one or more non-transitory computer-readable storage media of claim 17, wherein training the model further comprises the step of destroying the joined data set.

* * * * *